（12）United States Patent
Takeda

(10) Patent No.: US 8,108,674 B2
(45) Date of Patent: Jan. 31, 2012

(54) TRANSMITTING/RECEIVING SYSTEM AND METHOD, TRANSMITTING APPARATUS AND METHOD, RECEIVING APPARATUS AND METHOD, AND PROGRAM USED THEREWITH

(75) Inventor: Takayuki Takeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1287 days.

(21) Appl. No.: 11/461,213

(22) Filed: Jul. 31, 2006

(65) Prior Publication Data

US 2007/0033399 A1 Feb. 8, 2007

(30) Foreign Application Priority Data

Aug. 2, 2005 (JP) .................................. 2005-223740

(51) Int. Cl.
*H04L 9/08* (2006.01)
*H04L 9/32* (2006.01)
(52) U.S. Cl. ........ 713/168; 380/277; 380/278; 380/281; 380/283; 380/284; 713/171; 726/14
(58) Field of Classification Search .......... 713/168–171; 726/14; 380/200–201, 44–47, 52, 277–285
See application file for complete search history.

(56) References Cited

U.S. PATENT DOCUMENTS

| | | | | |
|---|---|---|---|---|
| 5,631,961 | A * | 5/1997 | Mills et al. ..................... | 380/286 |
| 7,055,030 | B2 * | 5/2006 | Negawa ........................ | 713/163 |
| 7,085,744 | B2 * | 8/2006 | Morrison ....................... | 705/71 |
| 7,099,479 | B1 * | 8/2006 | Ishibashi et al. .............. | 380/281 |
| 7,167,564 | B2 * | 1/2007 | Asano et al. ................... | 380/279 |
| 7,242,772 | B1 * | 7/2007 | Tehranchi ...................... | 380/223 |
| 7,305,711 | B2 * | 12/2007 | Ellison et al. .................. | 726/29 |
| 7,346,170 | B2 * | 3/2008 | Asano et al. ................... | 380/278 |
| 7,394,902 | B2 * | 7/2008 | Yamamichi et al. .......... | 380/277 |
| 7,555,128 | B2 * | 6/2009 | Ko et al. ....................... | 380/270 |

(Continued)

FOREIGN PATENT DOCUMENTS

JP 7-77933 3/1995

(Continued)

OTHER PUBLICATIONS

Bruce Schneier, Applied Cryptography—Protocol, Algorithms and source code C, 1996, Katherine Schwoltair, SEction 3.1, p. 51, Section 15.1 and 15.3—pp. 357-36, and section 19.3—p. 466-470.*

(Continued)

*Primary Examiner* — Nathan Flynn
*Assistant Examiner* — Viral Lakhia
(74) *Attorney, Agent, or Firm* — Oblon, Spivak, McClelland, Maier & Neustadt, L.L.P.

(57) ABSTRACT

A transmitting/receiving system includes a transmitting apparatus that transmits, to another apparatus, first encrypted data obtained by encrypting stream data including consecutive unit data items in accordance with a first encryption technique prescribing that, when the stream data is encrypted for each item, keys used for encrypting the items are updated, and a receiving apparatus that receives and decrypts the first data from the transmitting apparatus in accordance with a first decryption technique. The transmitting apparatus includes an encryptor that outputs second encrypted data obtained by generating data including a predetermined number of keys, and encrypting the data in accordance with a second encryption technique, a transmitter that transmits the second data from the encryptor to the receiving apparatus. The receiving apparatus includes a key receiver that receives the second data from the transmitter, and a key decryptor that decrypts the second data in accordance with a second decryption technique.

15 Claims, 10 Drawing Sheets

U.S. PATENT DOCUMENTS

| | | | |
|---|---|---|---|
| 7,610,485 B1* | 10/2009 | Yadav | 713/163 |
| 7,660,981 B1* | 2/2010 | Hunt | 713/156 |
| 2002/0199106 A1* | 12/2002 | Hayashi | 713/176 |
| 2003/0039361 A1 | 2/2003 | Hawkes et al. | |
| 2003/0198345 A1* | 10/2003 | Van Buer | 380/43 |
| 2004/0044891 A1* | 3/2004 | Hanzlik et al. | 713/150 |
| 2004/0105549 A1* | 6/2004 | Suzuki et al. | 380/278 |
| 2004/0136532 A1* | 7/2004 | Pinder et al. | 380/239 |
| 2004/0174824 A1* | 9/2004 | Ohta et al. | 370/252 |
| 2005/0135607 A1* | 6/2005 | Lee et al. | 380/28 |
| 2005/0286437 A1* | 12/2005 | Matsushita et al. | 370/252 |
| 2005/0289347 A1* | 12/2005 | Ovadia | 713/171 |
| 2006/0115088 A1* | 6/2006 | Valentine et al. | 380/270 |
| 2006/0126835 A1* | 6/2006 | Kim et al. | 380/44 |
| 2006/0126843 A1* | 6/2006 | Brickell et al. | 380/260 |
| 2006/0129811 A1* | 6/2006 | Fiske | 713/167 |
| 2006/0188098 A1* | 8/2006 | Kumagai et al. | 380/239 |
| 2006/0193472 A1* | 8/2006 | Yuen | 380/274 |
| 2007/0154018 A1* | 7/2007 | Watanabe | 380/273 |
| 2008/0247550 A1* | 10/2008 | Kozaki et al. | 380/278 |
| 2008/0285745 A1* | 11/2008 | Teglia et al. | 380/29 |

FOREIGN PATENT DOCUMENTS

| | | |
|---|---|---|
| JP | 9-64833 | 3/1997 |
| JP | 2001-86110 | 3/2001 |
| JP | 2003-143548 | 5/2003 |
| JP | 2004-532554 | 10/2004 |
| WO | WO 02/089413 A1 | 11/2002 |
| WO | WO 2004/105308 A1 | 12/2004 |

OTHER PUBLICATIONS

Weiwei Xiao, Watermarking Algorithm based on chaotic encryption, Aug. 2002, IEEE, 7803-7490, pp. 545-548.*

Satoru Wakao, et al., "MPEG-4 Implementation of encryption technology to IPMP system", Information Processing Society memoir, Japan, vol. 2000, No. 68, Jul. 25, 2000, 4 front pages, pp. 9-16 (with English Abstract).

* cited by examiner

FIG. 6

| LEKP (1) | LEKP (2) | LEKP (3) | LEKP (4) | LEKP (5) | LEKP (6) | Padding |
|---|---|---|---|---|---|---|
| 38 | 38 | 38 | 38 | 38 | 38 | 28 |

TRANSMITTING/RECEIVING SYSTEM AND METHOD, TRANSMITTING APPARATUS AND METHOD, RECEIVING APPARATUS AND METHOD, AND PROGRAM USED THEREWITH

CROSS REFERENCES TO RELATED APPLICATIONS

The present invention contains subject matter related to Japanese Patent Application JP 2005-223740 filed in the Japanese Patent Office on Aug. 2, 2005, the entire contents of which are incorporated herein by reference.

BACKGROUND OF THE INVENTION

1. Field of the Invention

The present invention relates to transmitting/receiving systems and methods, transmitting apparatuses and methods, receiving apparatuses and methods, and programs used therewith. In particular, the present invention relates to a transmitting/receiving system and method in which, when stream data is encrypted while key updating is performed in a predetermined updating period, the updating period is shortened as much as possible, a transmitting apparatus and method, and receiving apparatus and method used with the system and method, and a program used therewith.

2. Description of the Related Art

In recent years, a first encryption technique (see, for example, Japanese Unexamined Patent Application Publication No. 2003-143548) has been proposed and its use has been discussed. The first encryption technique prescribes that, when stream data including a plurality of consecutive unit data items is sequentially encrypted for each unit data item, keys used when the unit data items are encrypted are updated on the basis of predetermined rules.

Also, realization of a transmitting/receiving system has been discussed. The transmitting/receiving system includes a transmitting apparatus for encrypting stream data in accordance with a first encryption technique and transmitting the encrypted data to a different apparatus, and a receiving apparatus as the different apparatus for receiving the encrypted data and decrypting the encrypted data in accordance with a first decryption technique corresponding to the first encryption technique.

In addition, it is necessary for this transmitting/receiving system to transmit, from the transmitting apparatus to the receiving apparatus, a plurality of keys used when first encrypted data is generated. Accordingly, it has been discussed that, after the keys have been encrypted one by one in accordance with a second encryption technique, the encrypted keys are transmitted from the transmitting apparatus to the receiving apparatus.

In this embodiment, in order for the receiving apparatus to decrypt a predetermined portion (such as a predetermined unit data item) in the encrypted data (obtained by encrypting the stream data), it is necessary to prepare a key (corresponding to the predetermined portion) used for encrypting the predetermined portion. Specifically, before initiating decryption of the predetermined portion, the receiving apparatus needs to beforehand decrypt second encrypted data including an encryption key corresponding to the predetermined portion by using a second decryption technique corresponding to the second encryption technique.

Therefore, the updating period of the key is dependent on a processing time necessary for encryption and decryption in the second encryption technique (second decryption technique). Accordingly, for example, when the second encryption technique, whose processing time is approximately several seconds, is employed, approximately one minute is employed as the updating period of the key, in consideration of security.

SUMMARY OF THE INVENTION

In order for the transmitting/receiving system to be highly secure, it is preferable that as many keys as possible be exchanged for one unit data item of the stream data, that is, the key updating period of one minute is considered to be long and is preferably shortened as much as possible. However, in reality, there is no effective technique for shortening the key updating period.

The present invention has been made in view of the above circumstances. It is desirable to, when stream data is encrypted while key updating is performed in a predetermined updating period, shorten the updating period as much as possible.

According to an embodiment of the present invention, there is provided a transmitting/receiving system including a transmitting apparatus configured to transmit, to a different apparatus, first encrypted data obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules, and a receiving apparatus configured to receive and decrypt the first encrypted data transmitted from the transmitting apparatus in accordance with a first decryption technique corresponding to the first encryption technique by using a plurality of keys used for generating the first encrypted data. The transmitting apparatus includes a key encryptor configured to output second encrypted data obtained by generating data including keys whose number is represented by an integer value equal to one or greater among the plurality of keys used for generating the first encrypted data, and encrypting the generated data in accordance with a second encryption technique, a key transmitter configured to transmit the second encrypted data output from the key encryptor to the receiving apparatus. The receiving apparatus includes a key receiver configured to receive the second encrypted data transmitted from the key transmitter of the transmitting apparatus, and a key decryptor configured to decrypt the second encrypted data received by the key receiver in accordance with a second decryption technique corresponding to the second encryption technique.

According to another embodiment of the present invention, there is provided a transmitting/receiving method for a transmitting/receiving system including a transmitting apparatus configured to transmit, to a different apparatus, first encrypted data obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules, and a receiving apparatus configured to receive and decrypt the first encrypted data transmitted from the transmitting apparatus in accordance with a first decryption technique corresponding to the first encryption technique by using a plurality of keys used for generating the first encrypted data. The transmitting/receiving method includes the steps of, by the transmitting apparatus, performing generation of data including keys whose number is represented by an integer value equal to one or greater among the plurality of keys used for generating the first encrypted data, and encryption of the generated data in accordance with a second encryption technique, and transmitting the second encrypted data to the receiving apparatus, and, by the receiving apparatus, receiving the second encrypted data transmitted from the transmitting apparatus, and decrypting the received second encrypted data in accordance with a second decryption technique corresponding to the second encryption technique.

In a transmitting/receiving system and method according to embodiments of the present invention, a transmitting apparatus transmits, to a receiving apparatus, first encrypted data obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules. A receiving apparatus receives and decrypts the first encrypted data transmitted from the transmitting apparatus in accordance with a first decryption technique corresponding to the first encryption technique by using a plurality of keys used for generating the first encrypted data. The transmitting apparatus transmits, to the receiving apparatus, second encrypted data obtained by generating data including keys whose number is represented by an integer value equal to one or greater among the plurality of keys used for generating the first encrypted data, and encrypting the generated data in accordance with a second encryption technique. The receiving apparatus receives the second encrypted data transmitted from the transmitting apparatus, and decrypts the received second encrypted data in accordance with a second decryption technique according to the second encryption technique.

According to another embodiment of the present invention, there is provided a transmitting apparatus for transmitting, to a different apparatus, first encrypted data obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules. The transmitting apparatus includes a key encryptor configured to output second encrypted data obtained by generating data including i keys, where i represents an integer value equal to one or greater, among the plurality of keys used for generating the first encrypted data, and encrypting the generated data in accordance with a second encryption technique, and a key transmitter configured to transmit the second encrypted data output from the key encryptor to the receiving apparatus.

The second encryption technique may use the RSA encryption using 2048-bit data. The key encryptor may generate data having a total of 2048 bits as data to be encrypted in accordance with the RSA encryption by generating i N-bit information-data items respectively including at least the i keys, where N represents an integer value equal to 2048 or less, and i represents an integer value satisfying the expression i×N≦2048, arranging the i N-bit information-data items in predetermined order, and, following the i N-bit information-data items, arranging padding data having (2048-i×N) bits.

The transmitting apparatus may further include an Advanced-Encryption-Standard-key generator configured to generate Advanced-Encryption-Standard keys as the plurality of keys in accordance with the predetermined rules concerning key updating, an Advanced-Encryption-Standard-input generator configured to generate an Advanced-Encryption-Standard input including link-encryption-attribute data, and a stream encryptor configured to output the first encrypted data generated such that the stream data is encrypted by using the Advanced-Encryption-Standard keys generated by the Advanced-Encryption-Standard-key generator and the Advanced-Encryption-Standard input generated by the Advanced-Encryption-Standard-input generator. The first encryption technique may use the Advanced Encryption Standard. The key encryptor may generate, as one information-data item, data including one Advanced-Encryption-Standard key generated by the Advanced-Encryption-Standard-key generator and the link-encryption-attribute data included in the Advanced-Encryption-Standard input generated by the Advanced-Encryption-Standard-input generator.

Each information-data item may be formed as a 304-bit link-encryption-key payload. The key encryptor may generate, as data to be encrypted in accordance with the RSA encryption, data having a total of 2048 bits by generating and arranging six link-encryption-key payloads in predetermined order, where six is equal to i, and, following the six link-encryption-key payloads, arranging 224-bit padding data.

The key transmitter may transmit the second encrypted data to the different apparatus by transmitting data obtained by superimposing the second encrypted data output from the key encryptor on the first encrypted data output from the stream encryptor.

According to another embodiment of the present invention, there is provided a transmitting method for a transmitting apparatus for transmitting, to a different apparatus, first encrypted data obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules. The transmitting method includes the steps of generating data including keys whose number is represented by an integer value equal to one or greater among the plurality of keys used for generating the first encrypted data, and encrypting the generated data in accordance with a second encryption technique to generate second encrypted data, and transmitting the generated second encrypted data to the different apparatus.

A program corresponding to a transmitting method according to an embodiment of the present invention is a program to be executed by a computer for controlling processing for transmitting, to a different apparatus, first encrypted data obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules. The program includes the step of outputting second encrypted data obtained by generating data including keys whose number is represented by an integer value equal to one or greater among the plurality of keys used for generating the first encrypted data, and encrypting the generated data in accordance with a second encryption technique.

In a transmitting apparatus and method, and program according to embodiments of the present invention, first encrypted data is transmitted to a different apparatus, the first encrypted data being obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules. In addition, second encrypted data is transmitted to the different apparatus, the second encrypted data being obtained by generating data including keys whose number is represented by an integer value equal to one or greater among the plurality of keys used for generating the first encrypted data, and encrypting the generated data in accordance with a second encryption technique.

According to another embodiment of the present invention, there is provided a receiving apparatus for receiving first encrypted data when the first encrypted data is transmitted from a transmitting apparatus after being obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules, and decrypting the first encrypted data in accordance with a first decryption technique corresponding to the first encryption technique by using the plurality of keys used for generating the first encrypted data. The receiving apparatus includes a key receiver configured to receive second encrypted data when the second encrypted data is transmitted from the transmitting apparatus after being obtained by generating data including i keys, where i represents an integer value equal to one or greater, among the plurality of keys used for generating the first encrypted data, and encrypting the generated data in accordance with a second encryption technique, and a key decryptor configured to decrypt the second encrypted data received by the key receiver in accordance with a second decryption technique corresponding to the second encryption technique.

The second encryption technique may use the RSA encryption using 2048-bit data. The transmitting apparatus may generate, as data to be encrypted in accordance with the RSA encryption, data having a total of 2048 bits by generating i N-bit information-data items respectively including at least the i keys, where N represents an integer value equal to 2048 or less, and i represents an integer value satisfying the expression i×N≦2048, arranging the i N-bit information-data items in predetermined order, and, following the i N-bit information-data items, arranging padding data having (2048-i×N) bits. The key decryptor may restore the i information-data items by executing decryption in accordance with the second decryption technique, and extracts the keys respectively included in the i information-data items.

The first encryption technique may use the Advanced Encryption Standard. The transmitting apparatus may perform generating Advanced-Encryption-Standard keys as the plurality of keys in accordance with the predetermined rules concerning key updating, generating an Advanced-Encryption-Standard input including link-encryption-attribute data, outputting the first encrypted data generated such that the stream data is encrypted by using the generated Advanced-Encryption-Standard keys and the generated Advanced-Encryption-Standard input, generating, as one information-data item, data including one Advanced-Encryption-Standard key and the link-encryption-attribute data included in one Advanced-Encryption-Standard input. The key decryptor may restore the i information-data items by executing decryption in accordance with the second decryption technique, and extracts the Advanced-Encryption-Standard key and link-encryption-attribute data included in each of the i information-data items, and the receiving apparatus may further include an Advanced-Encryption-Standard-input generator configured to generate an Advanced-Encryption-Standard input corresponding to the Advanced-Encryption-Standard key extracted from a predetermined information-data item by the key decryptor by using the link-encryption-attribute data extracted from the predetermined information-data item by the key decryptor, and a stream decryptor configured to decrypt a portion encrypted by using the Advanced-Encryption-Standard key and included in the first encrypted data by using the Advanced-Encryption-Standard key extracted from the predetermined information-data item by the key decryptor and the Advanced-Encryption-Standard input generated correspondingly to the Advanced-Encryption-Standard key by the Advanced-Encryption-Standard input generator.

Each information-data item may be formed as a 304-bit link-encryption-key payload. The transmitting apparatus may generate, as data to be encrypted in accordance with the RSA encryption, data having a total of 2048 bits by generating and arranging six link-encryption-key payloads, where six is equal to i, in predetermined order, and, following the six link-encryption-key payloads, arranging 224-bit padding data.

When data obtained by superimposing the second encrypted data on the first encrypted data is transmitted to the receiving apparatus, after the key receiver receives and separates the data into the first encrypted data and the second encrypted data, the key receiver may provide the first encrypted data to the stream decryptor and may provide the second encrypted data to the key decryptor.

According to another embodiment of the present invention, there is provided a receiving method for receiving first encrypted data when the first encrypted data is transmitted from a transmitting apparatus after being obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules, and decrypting the first encrypted data in accordance with a first decryption technique corresponding to the first encryption technique by using the plurality of keys used for generating the first encrypted data. The receiving method includes the steps of receiving second encrypted data when the second encrypted data is transmitted from the transmitting apparatus after being obtained by generating data including keys whose number is represented by an integer value equal to one or greater among the plurality of keys used for generating the first encrypted data, and encrypting the generated data in accordance with a second encryption technique, and decrypting the received second encrypted data in accordance with a second decryption technique corresponding to the second encryption technique.

A program corresponding to a receiving method according to an embodiment of the present invention is a program to be executed by a computer for controlling processing for receiving first encrypted data when the first encrypted data is transmitted from a predetermined apparatus after being obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules, and decrypting the first encrypted data in accordance with a first decryption technique corresponding to the first encryption technique by using the plurality of keys used for generating the first encrypted data, and processing for receiving second encrypted data when the second encrypted data is transmitted from the predetermined apparatus after being obtained by generating data including keys whose number is represented by an integer value equal to one or greater among the plurality of keys used for generating the first encrypted data, and encrypting the generated data in accordance with a second encryption technique. The program includes the step of decrypting the received second encrypted data in accordance with a second decryption technique corresponding to the second encryption technique.

In a receiving apparatus and method, and program according to embodiments of the present invention, first encrypted data is received when the first encrypted data is transmitted from a transmitting apparatus after being obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules, and the first encrypted data is decrypted in accordance with a first decryption technique corresponding to the first encryption technique by using the plurality of keys used for generating the first encrypted data. In addition, second encrypted data is received when the second encrypted data is transmitted from the transmitting apparatus after being obtained by generating data including i keys, where i represents an integer value equal to one or greater, among the plurality of keys used for generating the first encrypted data, and encrypting the generated data in accordance with a second encryption technique, and the second encrypted data received by the key receiver is decrypted in accordance with a second decryption technique corresponding to the second encryption technique.

As described above, according to one embodiment of the present invention, stream data can be encrypted while key updating is performed in a predetermined updating period, and resultant encrypted data can be decrypted. In particularly, in these cases, the updating period can be shortened as much as possible.

BRIEF DESCRIPTION OF THE DRAWINGS

FIG. 6 is an illustration of an example of the structure of data to be encrypted by the RSA encryption unit in the cinema server in FIG. 1, that is, data including six LEKPs as shown in FIG. 5 and padding data;

DESCRIPTION OF THE PREFERRED EMBODIMENTS

Figure 1:
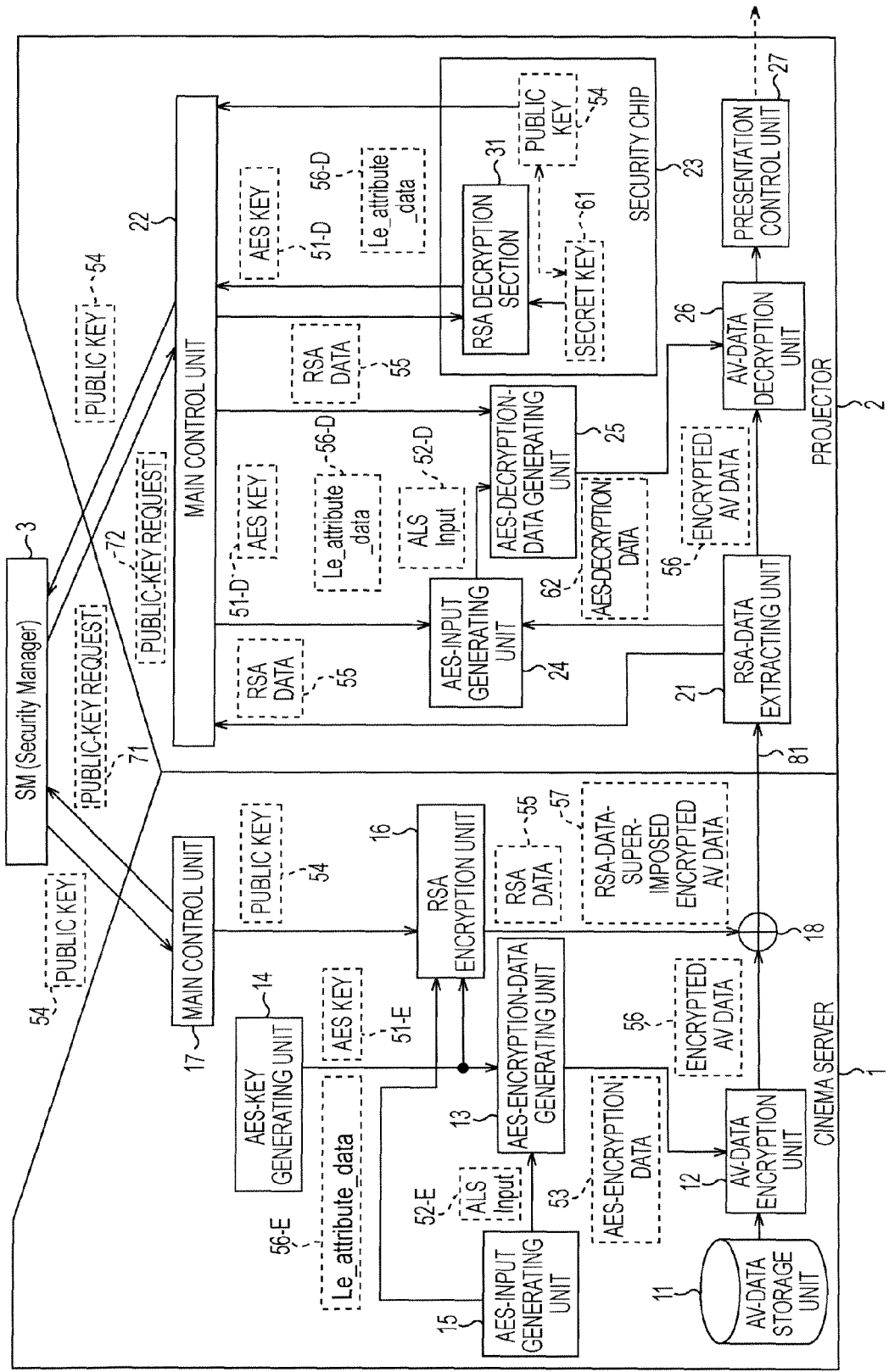
FIG. 1 is a block diagram showing a transmitting/receiving system to which an embodiment of the present invention is applied.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

A transmitting/receiving system (the transmitting/receiving system in FIG. 1) according to an embodiment of the present invention includes a transmitting apparatus (for example, the cinema server 1 in FIG. 1) configured to transmit, to a different apparatus, first encrypted data (for example, the encrypted AV data 56 in FIG. 1) obtained by encrypting stream data (for example, the AV data stored in the AV-data storage unit 11 in FIG. 1) including a plurality of consecutive unit data items (representing a frame (data), which is described later, in this example) in accordance with a first encryption technique prescribing that, when the stream data is sequentially encrypted for each unit data item, a plurality of keys (for example, the AES key 51-E in FIG. 1) used for encrypting the unit data items are updated on the basis of predetermined rules, and a receiving apparatus (for example, the projector 2 in FIG. 1) configured to receive and decrypt the first encrypted data transmitted from the transmitting apparatus in accordance with a first decryption technique corresponding to the first encryption technique by using a plurality of keys used for generating the first encrypted data.

The transmitting apparatus includes a key encryptor (for example, the RSA encryption unit 16 in FIG. 1) configured to output second encrypted data (for example, the RSA data 55 in FIG. 1) obtained by generating data (for example, the data having the structure in FIG. 6) including keys whose number is represented by an integer value equal to one or greater among the plurality of keys used for generating the first encrypted data, and encrypting the generated data in accordance with a second encryption technique, and a key transmitter (for example, the superimposition unit 18 in FIG. 1) configured to transmit the second encrypted data output from the key encryptor to the receiving apparatus.

The receiving apparatus includes a key receiver (for example, the RSA-data extracting unit 21 in FIG. 1) configured to receive the second encrypted data transmitted from the key transmitter of the transmitting apparatus, and a key decryptor (for example, the RSA decryption section 31 in FIG. 1) configured to decrypt the second encrypted data received by the key receiver in accordance with a second decryption technique corresponding to the second encryption technique.

A transmitting/receiving method according to an embodiment of the present invention is a transmitting/receiving method for a transmitting/receiving system including a transmitting apparatus (for example, the cinema server 1 in FIG. 1) configured to transmit, to a different apparatus, first encrypted data (for example, the encrypted AV data 56 in FIG.

1) obtained by encrypting stream data (for example, the AV data stored in the AV-data storage unit 11 in FIG. 1) including a plurality of consecutive unit data items (representing a frame (data), which is described later, in this example) in accordance with a first encryption technique prescribing that, when the stream data is sequentially encrypted for each unit data item, a plurality of keys (for example, the AES key 51-E in FIG. 1) used for encrypting the unit data items are updated on the basis of predetermined rules, and a receiving apparatus (for example, the projector 2 in FIG. 1) configured to receive and decrypt the first encrypted data transmitted from the transmitting apparatus in accordance with a first decryption technique corresponding to the first encryption technique by using a plurality of keys used for generating the first encrypted data, wherein the transmitting/receiving method includes the steps of, by the transmitting apparatus, performing generation of data (for example, the data having the structure in FIG. 6) including keys whose number is represented by an integer value equal to one or greater among the plurality of keys used for generating the first encrypted data, and encryption (for example, a process of the RSA encryption unit 16 in FIG. 1, specifically, the process in FIG. 7) of the generated data in accordance with a second encryption technique to generate second encrypted data (for example, the RSA data 55 in FIG. 1), and transmitting (for example, a process of the superimposition unit 18 in FIG. 1) the second encrypted data to the receiving apparatus, and, by the receiving apparatus, receiving (for example, a process of the RSA-data extracting unit 21 in FIG. 1) the second encrypted data transmitted from the transmitting apparatus, and decrypting (for example, a process of the RSA decryption section 31 in FIG. 1) the received second encrypted data in accordance with a second decryption technique corresponding to the second encryption technique. A transmitting apparatus (for example, the cinema server 1 in FIG. 1) according to an embodiment of the present invention transmits, to a different apparatus, first encrypted data (for example, the encrypted AV data 56 in FIG. 1) obtained by encrypting stream data (for example, the AV data stored in the AV-data storage unit 11 in FIG. 1) including a plurality of consecutive unit data items (representing a frame (data), which is described later, in this example) in accordance with a first encryption technique prescribing that, when the stream data is sequentially encrypted for each unit data item, a plurality of keys (for example, the AES key 51-E in FIG. 1) used for encrypting the unit data items are updated on the basis of predetermined rules. The transmitting apparatus includes a key encryptor (for example, the RSA encryption unit 16 in FIG. 1) configured to output second encrypted data (for example, the RSA data 55 in FIG. 1) obtained by generating data (for example, the data having the structure in FIG. 6) including a predetermined number of keys, whose number is represented by an integer value equal to one or greater, among the plurality of keys used for generating the first encrypted data, and encrypting the generated data in accordance with a second encryption technique, and a key transmitter (for example, the superimposition unit 18 in FIG. 1) configured to transmit the second encrypted data output from the key encryptor to the receiving apparatus.

In the transmitting apparatus according to the embodiment of the present invention, the first encryption technique uses the Advanced Encryption Standard encryption.

The transmitting apparatus according to the embodiment of the present invention may include an Advanced-Encryption-Standard-key generator (for example, the AES-key generating unit 14 in FIG. 1) configured to generate Advanced-Encryption-Standard keys as the plurality of keys in accordance with the predetermined rules concerning key updating, an Advanced-Encryption-Standard-input generator configured to generate an Advanced-Encryption-Standard input (for example, the AES-input generating unit 15 in FIG. 1) including link-encryption-attribute data (for example, the Le_attribute_data 56-E in FIG. 1), and a stream encryptor (for example, the AV-data encryption unit 12 in FIG. 1) configured to output the first encrypted data generated such that the stream data is encrypted by using (for example, by using the AES-encryption data 53 generated by the AES-encryption-data generating unit 13 on the basis of the Le_attribute_data 56-E and the AES input 52-E) the Advanced-Encryption-Standard keys generated by the Advanced-Encryption-Standard-key generator and the Advanced-Encryption-Standard input generated by the Advanced-Encryption-Standard-input generator. The key encryptor may generate, as one information-data item, data including one Advanced-Encryption-Standard key generated by the Advanced-Encryption-Standard-key generator and the link-encryption-attribute data included in the Advanced-Encryption-Standard input generated by the Advanced-Encryption-Standard-input generator.

Figure 5:
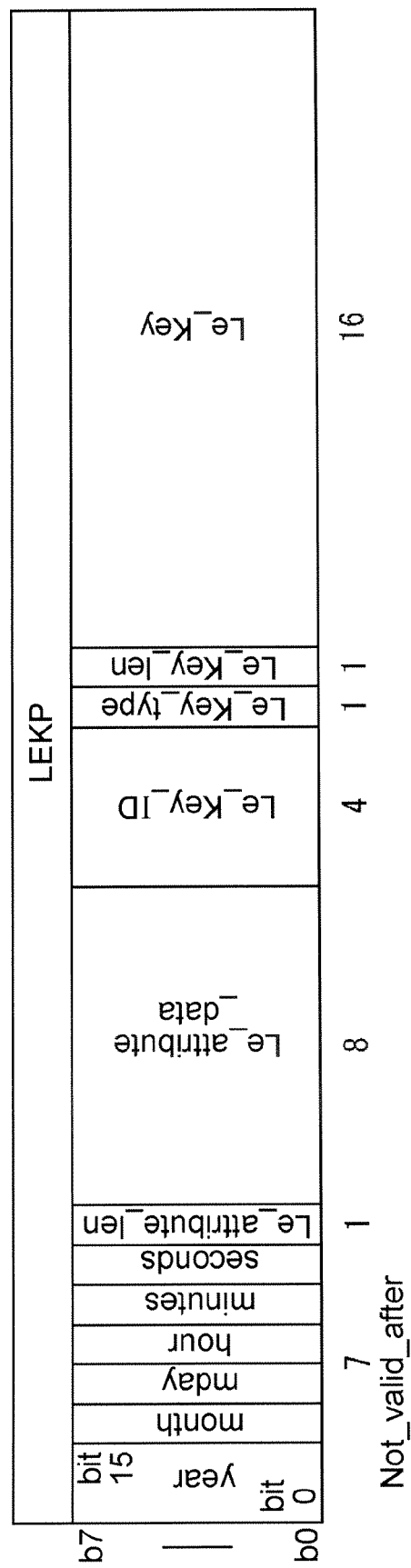
FIG. 5 is an illustration of an example of a link-encryption-key payload that is part of an object to be encrypted by an RSA encryption unit in the cinema server in FIG. 1, that is, an illustration of an example of the structure of a link-encryption-key payload including one AES key.

In the transmitting apparatus according to the embodiment of the present invention, each information-data item may be formed (for example, as shown in FIG. 5) as a 304-bit link-encryption-key payload.

The key encryptor generates, as data to be encrypted in accordance with the RSA encryption, data (for example, the data having the structure in FIG. 6) having a total of 2048 bits by generating and arranging six link-encryption-key payloads (for example, LEKP (1) to LEKP (6) in FIG. 6) in predetermined order, where six is equal to i, and, following the six link-encryption-key payloads, arranging 224-bit padding data (for example, the PADDING in FIG. 6).

In the transmitting apparatus according to the embodiment of the present invention, the key transmitter may transmit the second encrypted data to the different apparatus by transmitting data (for example, the RSA-data-superimposed encrypted AV data 57 in FIG. 1) obtained by superimposing the second encrypted data output from the key encryptor on the first encrypted data output from the stream encryptor.

A transmitting method according to an embodiment of the present invention is a transmitting method for a transmitting apparatus (for example, the cinema server 1 in FIG. 1) for transmitting, to a different apparatus (for example, the projector 2 in FIG. 1), first encrypted data obtained by encrypting stream data including a plurality of consecutive unit data items in accordance with a first encryption technique prescribing that, when the stream data is sequentially encrypted for each unit data item, a plurality of keys (for example, the AES key 51-E in FIG. 1) used for encrypting the unit data items are updated on the basis of predetermined rules. The transmitting method includes the steps of generating data (for example, the data having the structure in FIG. 6) including keys whose number is represented by an integer value equal to one or greater among the plurality of keys used for generating the first encrypted data, and encrypting (for example, a process of the RSA encryption unit 16 in FIG. 1, specifically, the process in FIG. 7) the generated data in accordance with a second encryption technique to generate second encrypted data, and transmitting (for example, a process of the superimposition unit 18 in FIG. 1) the generated second encrypted data (for example, the RSA data 55 in FIG. 1) to the different apparatus.

A first program according to an embodiment of the present invention corresponds to the above-described transmitting method according to the embodiment of the present invention.

A receiving apparatus (for example, the projector 2 in FIG. 1) according to another embodiment of the present invention is a receiving apparatus for receiving first encrypted data (for example, the encrypted AV data 56 in FIG. 1) when the first encrypted data is transmitted from a transmitting apparatus (for example, the cinema server 1 in FIG. 1) after being obtained by encrypting stream data (for example, the AV data stored in the AV-data storage unit 11 in FIG. 1) including a plurality of consecutive unit data items (representing a frame (data), which is described later, in this example) in accordance with a first encryption technique prescribing that, when the stream data is sequentially encrypted for each unit data item, a plurality of keys (for example, the AES key 51-E in FIG. 1) used for encrypting the unit data items are updated on the basis of predetermined rules, and decrypting the first encrypted data in accordance with a first decryption technique corresponding to the first encryption technique by using the plurality of keys used for generating the first encrypted data, the receiving apparatus including a key receiver (for example, the RSA-data extracting unit 21 in FIG. 1) configured to receive second encrypted data (for example, the RSA data 55 in FIG. 1) when the second encrypted data is transmitted from the transmitting apparatus after being obtained by generating data (for example, the data having the structure in FIG. 6) including i keys, where i represents an integer value equal to one or greater, among the plurality of keys used for generating the first encrypted data, and encrypting the generated data in accordance with a second encryption technique, and a key decryptor (for example, the RSA decryption section 31 in FIG. 1) configured to decrypt the second encrypted data received by the key receiver in accordance with a second decryption technique corresponding to the second encryption technique.

In the receiving apparatus according to the embodiment of the present invention, the first encryption technique uses the Advanced Encryption Standard, the transmitting apparatus performs generating Advanced-Encryption-Standard keys as the plurality of keys in accordance with the predetermined rules concerning key updating, generating an Advanced-Encryption-Standard input including link-encryption-attribute data, outputting the first encrypted data generated such that the stream data is encrypted by using the generated Advanced-Encryption-Standard keys and the generated Advanced-Encryption-Standard input, and generating, as one information-data item, data including one Advanced-Encryption-Standard key and the link-encryption-attribute data included in one Advanced-Encryption-Standard input. The key decryptor restores the i information-data items by executing decryption in accordance with the second decryption technique, and extracts the Advanced-Encryption-Standard key (for example, the AES key 51-D in FIG. 1) and link-encryption-attribute data (for example, the Le_attribute_data 56-D in FIG. 1) included in each of the i information-data items. The receiving apparatus further includes an Advanced-Encryption-Standard-input generator (for example, the AES-input generating unit 24 in FIG. 1) configured to generate an Advanced-Encryption-Standard input (for example, the AES Input 52-D in FIG. 1) corresponding to the Advanced-Encryption-Standard key extracted from a predetermined information-data item by the key decryptor by using the link-encryption-attribute data extracted from the predetermined information-data item by the key decryptor, and a stream decryptor (for example, the AV-data decryption unit 26 in FIG. 1) configured to decrypt a portion encrypted by using the Advanced-Encryption-Standard key and included in the first encrypted data by using the Advanced-Encryption-Standard key extracted from the predetermined information-data item by the key decryptor and the Advanced-Encryption-Standard input generated correspondingly to the Advanced-Encryption-Standard key by the Advanced-Encryption-Standard input generator (by using, for example, the AES-decryption data 62 generated on the basis of the Le_attribute_data 56-D and AES Input 52-D by the AES-decryption-data generating unit 25 in FIG. 1).

In the receiving apparatus according to the embodiment of the present invention, each information-data item may be formed (for example, as shown in FIG. 5) as a 304-bit link-encryption-key payload. The transmitting apparatus generates, as data to be encrypted in accordance with the RSA encryption, data having a total of 2048 bits by generating and arranging six link-encryption-key payloads (for example, LEKP (1) to LEKP (6) in FIG. 6), where six is equal to i, in predetermined order, and, following the six link-encryption-key payloads, arranging 224-bit padding data (for example, the PADDING in FIG. 6).

In the receiving apparatus according to the embodiment, AV data 57 in FIG. 1) obtained by superimposing the second encrypted data on the first encrypted data is transmitted to the receiving apparatus, after the key receiver receives and separates the data into the first encrypted data and the second encrypted data, the key receiver may provide the first encrypted data to the stream decryptor and provides the second encrypted data to the key decryptor.

A receiving method according to another embodiment of the present invention is a receiving method for a receiving apparatus (for example, the projector 2 in FIG. 1) for receiving first encrypted data (for example, the encrypted AV data 56 in FIG. 1) when the first encrypted data is transmitted from a transmitting apparatus (for example, the cinema server 1 in FIG. 1) after being obtained by encrypting stream data (for example, the AV data stored in the AV-data storage unit 11) including a plurality of consecutive unit data items (representing a frame (data), which is described later) in accordance with a first encryption technique prescribing that, when the stream data is sequentially encrypted for each unit data item, a plurality of keys (for example, the AES key 51-E in FIG. 1) used for encrypting the unit data items are updated on the basis of predetermined rules, and decrypting the first encrypted data in accordance with a first decryption technique corresponding to the first encryption technique by using the plurality of keys used for generating the first encrypted data, the receiving method including the steps of receiving second encrypted data (for example, the RSA data 55 in FIG. 1) when the second encrypted data is transmitted (for example, a process of the RSA-data extracting unit 21 in FIG. 1) from the transmitting apparatus after being obtained by generating data (for example, the data having the structure in FIG. 6) including keys whose number is represented by an integer value equal to one or greater among the plurality of keys used for generating the first encrypted data, and encrypting the generated data in accordance with a second encryption technique, and decrypting (for example, a process of the RSA decryption section 31 in FIG. 1) the received second encrypted data in accordance with a second decryption technique corresponding to the second encryption technique.

A second program according to another embodiment of the present invention corresponds to the above-described receiving method according to the embodiment of the present invention.

Embodiments of the present invention are described below with reference to the accompanying drawings.

FIG. 1 is a block diagram showing an example of the configuration of a transmitting/receiving system to which an embodiment of the present invention is applied.

In FIG. 1, rectangles indicated by the solid lines indicate blocks as elements of the system (apparatus), and rectangle indicated by the dotted lines indicate predetermined pieces of information. Such separate use of the solid lines and the dotted lines can apply to other drawings, which are described later.

In the example in FIG. 1, the transmitting/receiving system includes a cinema server 1 for outputting encrypted AV data obtained by encrypting stream data (hereinafter referred to as "AV data") corresponding to content (such as a movie) formed, for example, in units of frames, a projector 2 for playing back (projecting) decrypted AV data by decrypting the AV data output in encrypted form from the cinema server 1, and an SM (security manager) 3.

In the example in FIG. 1, the cinema server 1 encrypts the AV data by using one of common key cryptography systems, AES (Advanced Encryption Standard) encryption. Accordingly, the cinema server 1 includes an AV-data storage unit 11, an AV-data encryption unit 12, an AES-encryption-data generating unit 13, an AES-key generating unit 14, and an AES-input generating unit 15.

Specifically, the AV-data storage unit 11 stores at least one piece of AV data. The form of the AV data is not particularly limited, but the AV data in this embodiment is data based on HD-SDI which includes at least one frame data item. In addition, a frame data item includes data Y representing the luminance of each pixel included in the frame, and data Cb/Cr representing the color of each pixel included in the frame.

The AV-data encryption unit 12 acquires predetermined AV data from the AV-data storage unit 11, uses AES-encryption data 53 to encrypt the acquired data, and provides the obtained AV data 56 (hereinafter referred to as the "encrypted AV data 56") to a superimposition unit 18.

The AES-encryption data 53 used in this processing for encrypting the AV data by the AV-data encryption unit 12 is generated by the AES-encryption-data generating unit 13. Specifically, the AES-encryption-data generating unit 13 uses an AES key 51-E and an AES input 52-E to generate the AES-encryption data 53, which is used for direct encryption of AV data, and provides the generated AES-encryption data 53 to the AV-data encryption unit 12. Processing by the AES-encryption-data generating unit 13, the AES key 51-E and AES input 52-E necessary for the processing, the AES-encryption data 53 as the result of the processing, etc., are fully described below with reference to the FIGS. 2 to 4.

The AES key 51-E and AES input 52-E used for generating the AES-encryption data 53 by the AES-encryption-data generating unit 13 are generated by the AES-key generating unit 14 and the AES-input generating unit 15, respectively. In other words, the AES-key generating unit 14 is formed as, for example, a random coefficient generator. For example, in this embodiment, the AES-key generating unit 14 generates and provides 128-bit data as the AES key 51-E to the AES-encryption-data generating unit 13 and the RSA encryption unit 16. Also, in this embodiment, the AES-input generating unit 15 provides the AES-encryption-data generating unit 13 with the AES input 52-E, which includes Le_attribute_data 56-E, and provides the RSA encryption unit 16 with the Le_attribute_data 56-E included in the AES input 52-E.

As described above, in this embodiment, after being subject to encrypting processing based on AES encryption, AV data is transmitted as the encrypted AV data 56 (more accurately, RSA-data-superimposed encrypted AV data 57, which is described later) to the projector 2 at the receiving end.

Therefore, the AES key 51-E used in the AES encryption is one of the most important data items that should be protected in the transmitting/receiving system. Accordingly, in the example in FIG. 1, the cinema server 1 further includes the RSA encryption unit 16 in order to encrypt the AES key 51-E.

Specifically, the RSA encryption unit 16 adds supplemental information, such as the Le_attribute_data 56-E from the AES-input generating unit 15, to the AES key 51-E from the AES-key generating unit 14, and performs an encrypting process on the resultant data (hereinafter referred to as the "LEKP" (link encryption key payload) in accordance with RSA (R. Rivest, A. Shamir, L. Adelman) 2048-bit encryption system (hereinafter referred to as "RSA encryption") that uses a public key 54 of the projector 2 at the receiving end. The RSA encryption unit 16 provides the obtained RSA data 55 to the superimposition unit 18.

It should be noted that, although the RSA data 55 includes only one encrypted LEKP in the case of related art, it includes a plurality of encrypted LEKPs in this embodiment. Details (such as a reason) of this point are described later with reference to FIGS. 5 and 6.

As described above, after being subject to the encrypting process in accordance with RSA encryption, the encrypted AES key 51-E is transmitted as the RSA data 55 (more accurately, as described later, as the RSA-data-superimposed encrypted AV data 57 obtained by superimposition on the encrypted AV data 56) to the projector 2 at the receiving end.

Accordingly, in the example in FIG. 1, in order to acquire the public key 54 from the projector 2, the cinema server 1 further includes a main control unit 17.

Specifically, the main control unit 17 acquires the public key 54 from the projector 2 through an SM (security manager) 3, and provides the public key 54 to the RSA encryption unit 16. Specifically, for example, the main control unit 17 issues, to the SM 3, a public-key request 71 for requesting acquisition of the public key 54. In response to the public-key request 71, the SM 3 issues a public-key request 72 (more accurately, a main control unit 22, which is described later) to the projector 2. In response to the public-key request 72, the projector 2 acquires the public key 54 from a built-in security chip 23 (fully described later with reference to FIGS. 8 and 9), and provides the public key 54 to the SM 3. The SM 3 provides the acquired public key 54 to the main control unit 17. Accordingly, the main control unit 17 acquires and provides the public key 54 to the RSA encryption unit 16.

Furthermore, in the example in FIG. 1, the cinema server 1 further includes the superimposition unit 18. The superimposition unit 18 superimposes the RSA data 55 from the RSA encryption unit 16 on the encrypted AV data 56 from the AV-data encryption unit 12, and outputs the resultant RSA-data-superimposed encrypted AV data 57 to the projector 2.

Specifically, since the AV data is data based on HD-SDI in this embodiment, the superimposition unit 18 superimposes (inserts) the RSA data 55 included in the encrypted AV data 56 in, for example, a vertical blanking period, and outputs (transmits) the resultant RSA-data-superimposed encrypted AV data 57 to the projector 2. In this embodiment, when one frame data item includes two field data items, the RSA data 55 is inserted in a vertical blanking period of either of the two field data items. In other words, in this embodiment, the RSA data 55 is inserted in units of frames.

In such a manner, the RSA-data-superimposed encrypted AV data 57 output from the cinema server 1 is transmitted to the projector 2 (more accurately, an RSA-data extracting unit 21, which is described later) through a transmission line 81.

The form of the transmission line 81, that is, a transmission form of the RSA-data-superimposed encrypted AV data 57, is not particularly limited, but may be arbitrary. Since, for example, the RSA-data-superimposed encrypted AV data 57 is data based on HD-SDI, a transmission form therefor may be a single link (transmission form using one HD-SDI interface), and may be Link-A of a dual link (form using two HD-SDI interfaces).

In this embodiment, the dual link is employed as the transmission form of the RSA-data-superimposed encrypted AV data 57. This is partly because the dual link can transfer 12 bits (4:4:4). Video based on ordinary SD or HD data has 4:2:2, so that only a color resolution that is half that of the original video can be obtained. It is also because, unlike that, HD data (HD video) that is transferred by the dual link has 4:4:4, thus maintaining the original HD color resolution and producing greatly high picture quality. In addition, in this embodiment, the AV data is digital cinema (movie) data, and its color resolution is four times that of HD video. Accordingly, four dual links are employed. In other words, in this embodiment, the transmission line 81 includes eight cables (use of four dual links indicates 2×4=8 because one dual link includes two cables) complying with HD-SDI interface standard.

Before describing the projector 2, details of the AES-encryption-data generating unit 13 are described with reference to FIGS. 2 to 4, and an example of the structure of the RSA data 55 is described with reference to FIGS. 5 and 6.

Figure 2:
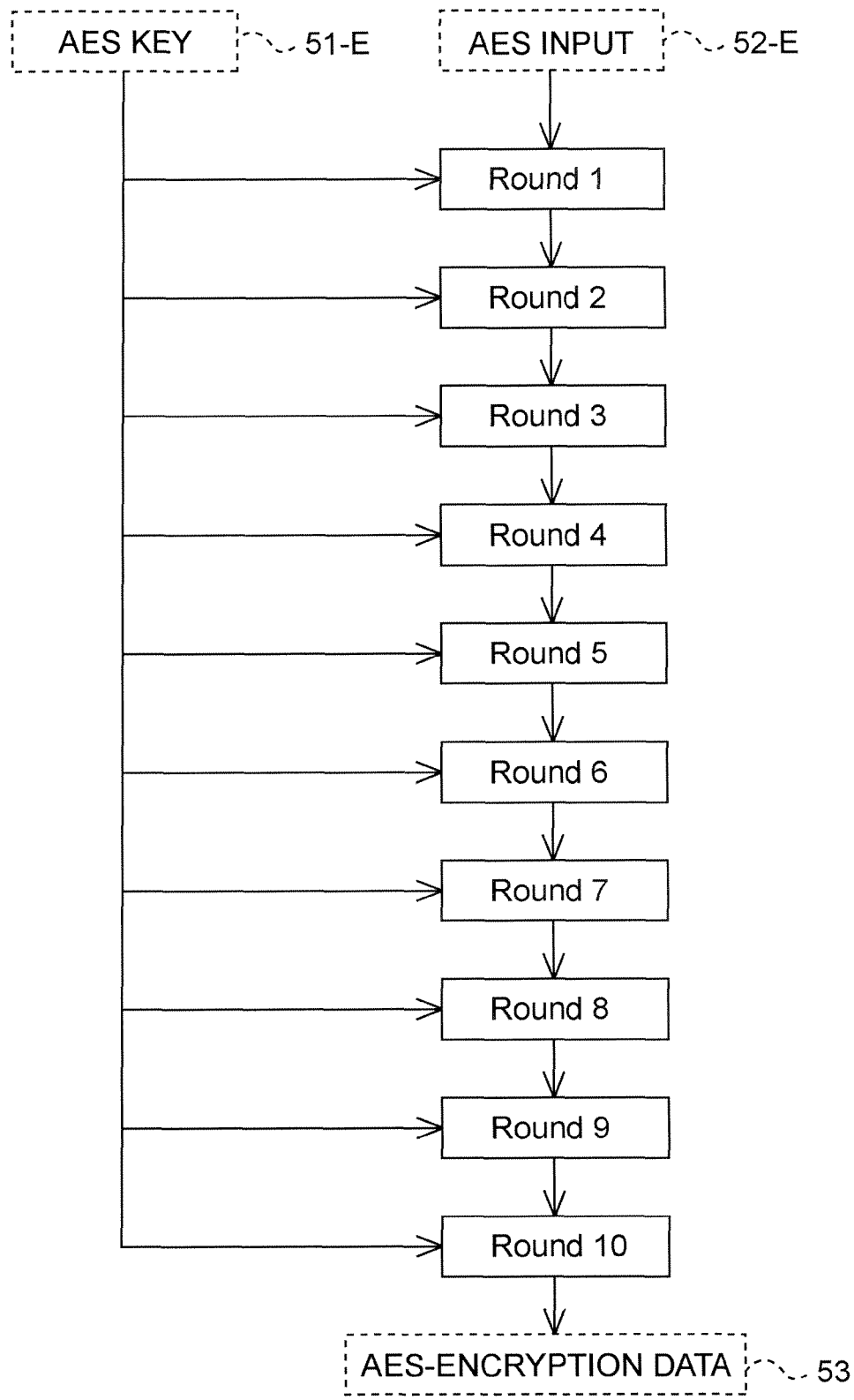
FIG. 2 is an illustration of an example of a process (algorithm) of an AES-encryption-data generating unit in the cinema server shown in FIG. 1.

FIG. 2 is an illustration of processing (algorithm) by the AES-encryption-data generating unit 13. Specifically, the AES-encryption-data generating unit 13 handles the AES key 51-E having 128 bits as an input data item (so-called "plaintext"), and performs an encrypting process on the input data item in accordance with the block encryption (system) shown in FIG. 2. The AES-encryption-data generating unit 13 outputs and provides the resultant 128-bit data (data finally output from Round 10, which is described later) as the AES-encryption data 53 to the AV-data encryption unit 12.

In FIG. 2, Round 1 to Round 10 indicate the first round process to the tenth round process, respectively. In Round 1, the first process is executed, with the 128-bit AES key 51-E used as an input data item, and the 128-bit AES input 52-E used as a round key. In Round K (K represents one of values 2 to 10), the K-th process is executed, with the 128-bit AES key 51-E as an input data item, and an output data item (128-bit data) of the last Round (K-1) as a round key. An output data item (128-bit data) of the final Round 10 is provided as the AES-encryption data 53 to the AV-data encryption unit 12.

Figure 3:
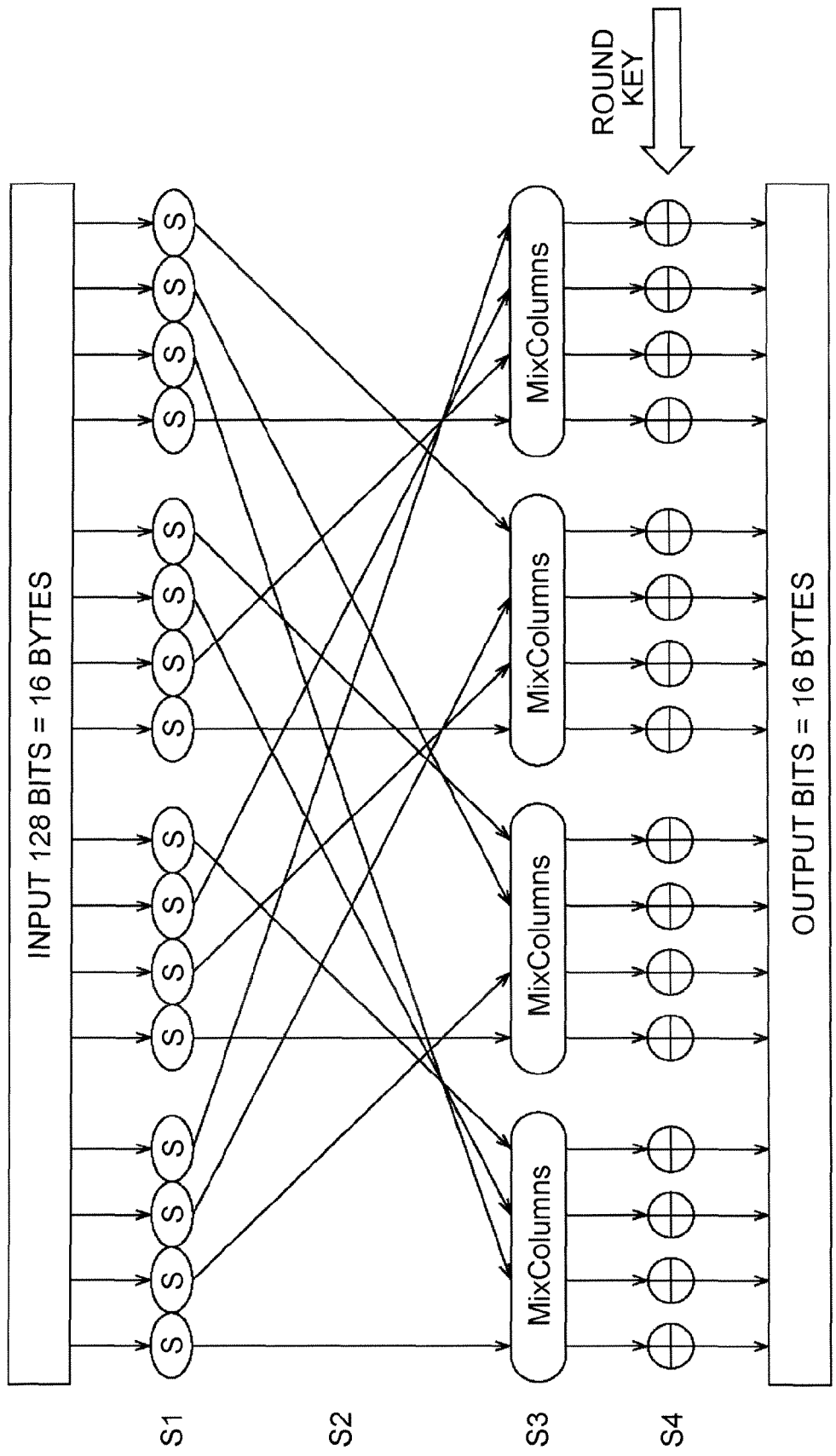
FIG. 3 is an illustration of detailed examples of processes (algorithms) of Round 1 to Round 10 in the process (algorithm) shown in FIG. 2.

Specifically, for example, each of Round 1 to Round 10 is the process (algorithm) shown in FIG. 3. In other words, FIG. 3 is an illustration of details of the first round process (algorithm).

As shown in FIG. 3, one round process includes consecutive steps S1 to S4.

In step S1, the AES key 51-E, which is an input data item (the block bearing "INPUT 128 BITS=16 BYTES" in FIG. 3), is divided into sixteen 8-bit sub-blocks (the blocks bearing the letters "S" in FIG. 3).

In step S2, the sixteen sub-blocks are rearranged, that is, the positions of the sub-blocks in the arrangement are changed.

In step S3, a predetermined matrix operation is implemented on four (four columns of) sub-blocks, with the four sub-blocks regarded as a matrix.

In step S4, a round key is added to a data item obtained in step S3, with 8 bits (=1 byte) used as a unit.

A 128-bit data item obtained in step S4 serves as an output data item (the block bearing "OUTPUT BITS=16 BYTES") of one round process. In other words, as described above, output data items of Round 1 to Round 9 are used as round keys for the next rounds. The output data item of Round 10 is provided as the AES-encryption data 53 to the AV-data encryption unit 12.

Figure 4:
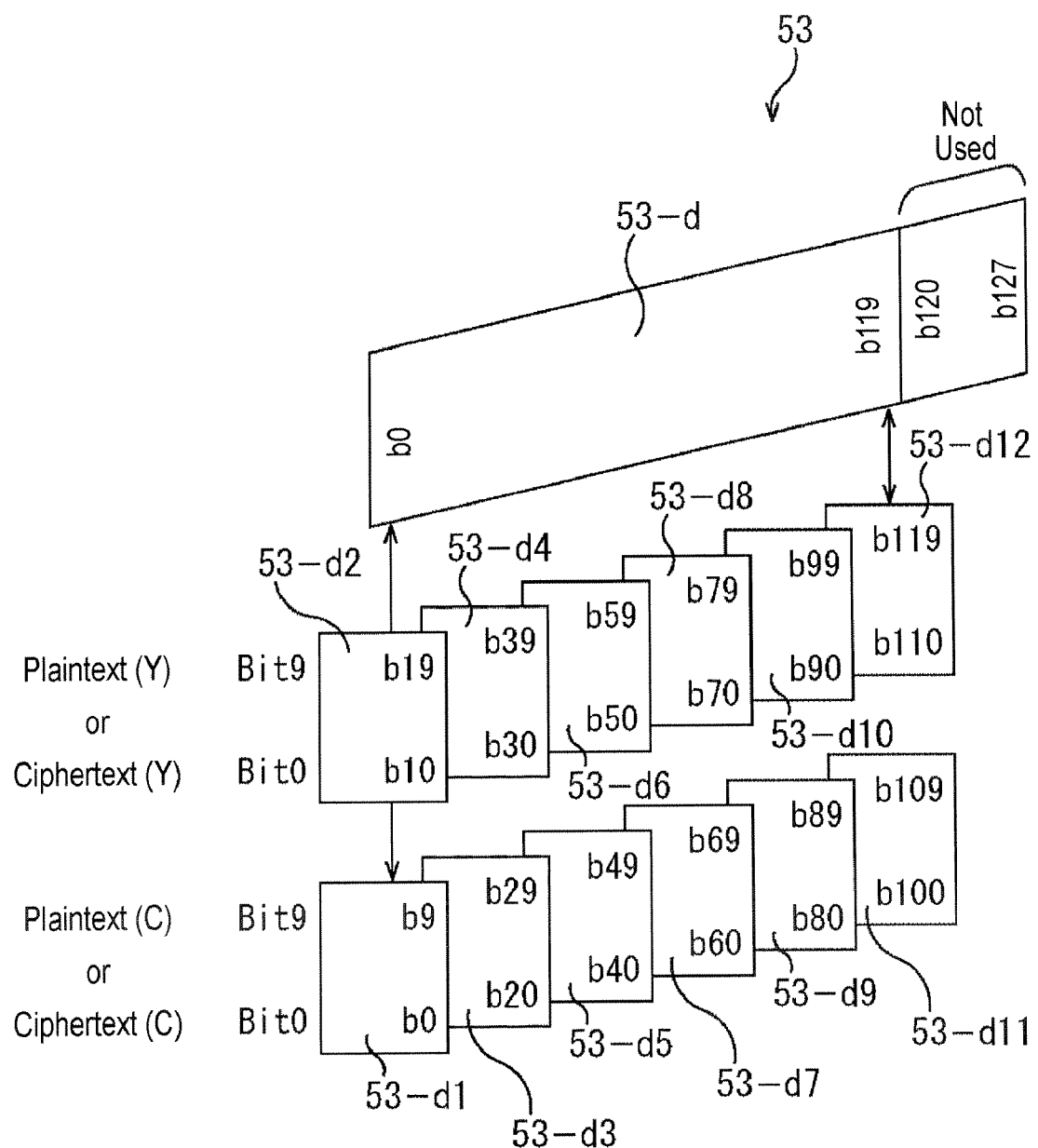
FIG. 4 is an illustration of an example of a technique for providing AES-encryption data to be provided from an AES-encryption-data generating unit to an AV-data encryption unit in the cinema server shown in FIG. 1.

More accurately, in this embodiment, as shown in FIG. 4, the AES-encryption-data generating unit 13 handles, as data that is actually used for AV data encryption, data 53-$d$ of lower 120 bits among the 128 bits forming the AES-encryption data 53. The AES-encryption-data generating unit 13 separates the data 53-$d$ in units of 10 bits, and provides the AV-data encryption unit 12 with twelve data items 53-$d1$ to 53-$d12$ separated in units of 10 bits.

As described above, in this embodiment, the AV data includes data Y and data Cb/Cr. Accordingly, regarding data Y and data Cb/Cr, data items in units to be encrypted are referred to as a Y-unit data item and a C-unit data item, respectively. In this case, in the this embodiment, by using the twelve data items 53-$d1$ to 53-$d12$ one by one, the AV-data encryption unit 12 encrypts six Y-unit data items and six C-unit data items in real time, and separately providing the encrypted data items to the superimposition unit 18.

In addition, in the this embodiment, a for example, a counter mode is employed as an AES encryption (block encryption) employed in processing for encrypting AV data. In the counter mode, by implementing the exclusive OR between a bit string generated by encrypting a counter value that is incremented by one and a plaintext block, a ciphertext block can be obtained. In the example in FIG. 1, the bit string generated by encrypting the counter value that is incremented by one corresponds to the AES-encryption data 53 (more accurately, data items 53-$d1$ to 53-$d12$ generated by dividing the AES-encryption data 53), and the plaintext block corresponds to the AV data (more accurately, the Y-unit data items and the C-unit data items). Also, the counter value corresponds to the AES input 52-E.

Therefore, if encryption of the Y-unit data items and the C-unit data items needs one cycle, and encryption of one Y-unit data item and encryption of one C-unit data item are executed in parallel, encryption using one item of the AES-encryption data 53, that is, encryption of six Y-unit data items and six C-unit data items needs six cycles. Accordingly, in this embodiment, the AES-input generating unit 15 in FIG. 1 includes a counter (not shown) that counts up every six cycles, and the AES input 52-E is generated on the basis of the count value of this counter. This allows the AES-encryption data 53, which is necessary for the encrypting process in accordance with AES encryption, to be supplied to the AV-data encryption unit 12 in proper quantities while being constantly changed.

In addition, if one cycle is necessary for one round process (Round 1 to Round 10) by the AES-encryption-data generating unit 13, eleven cycles are necessary until one item of the AES-encryption data 53 is generated. Accordingly, a problem occurs in that it is difficult to provide new item of the AES-encryption data 53 to the AV-data encryption unit 12 every six cycles. In this case, for example, by providing two AES-encryption-data generating units 13 (or providing two functions capable of separately executing the processing in FIG. 2), and shifting timing with which an item of the AES-encryption data 53 is generated, the above problem can be solved.

The details of the AES-encryption-data generating unit 13 have described with reference to FIGS. 2 to 4.

Next, an example of the structure of the RSA data 55 is described below with reference to FIGS. 5 and 6.

FIG. 5 shows an example of the structure of the above-described LEKP, that is, data to be subject to the encrypting process of the RSA encryption unit 16 in accordance with RSA encryption.

In the example in FIG. 5, the LEKP includes (not in order) time information representing an expiration time (year, month, in-month day, hours, minutes, and seconds), Le_attribute_data 56-E, which is one of the elements of the AES input 52-E, Le_attribute_len representing the data length of the Le_attribute_data 56-E, information (Le_Key ID, Le_Key_type, and Le_Key_len) specifying the AES key 51-E, and 128-bit Le_Key that is the AES key 51-E. Each value (for example, the value indicated below the Le_key) indicated below each data item shown in FIG. 5 represents the data size of the data item in units of bytes. Accordingly, in the example in FIG. 5, the sum of the values, 38 bytes (304 bits), is the data size of the LEKP.

In this embodiment, only one AES key 51-E included as the Le_Key in the LEKP is not used for one AV data item (the entire stream data) but is updated if necessary. In other words, for one AV data item, a plurality of AES keys 51-E are used. The reason is as follows.

In other words, assuming that a malicious third party has stolen AES-encrypted content (such as the encrypted AV data 56 output from the AV-data encryption unit 12 in this embodiment), if the content is encrypted by using one type of AES key (the AES key 51-E in this embodiment), a problem occurs in that a risk of the AES key being directly decoded increases. Accordingly, in order to solve this problem, the AES-key generating unit 14 periodically changes (updates if necessary) the AES key 51-E so as to make it difficult for the third party to directly decrypt the content.

In addition, in this embodiment, the AES key 51-E is not transmitted in unchanged form to the projector 2. The RSA encryption unit 16 generates the LEKP (FIG. 5) in which supplemental data (such as the Le_attribute_data 56-E) is added to the AES key 51-E, and performs the encrypting process on the LEKP in accordance with RSA encryption.

In RSA encryption, the use of 2048 bits is prescribed. Specifically, according to prescription of RSA encryption, a payload portion to be encrypted can handle up to 2048 bits. If all the 2048 bits are not assigned, a free area is subject to padding. Since, as described above, large data of 2048 bits is handled in RSA encryption, approximately several seconds are necessary for processing for the encrypting process and decrypting process in accordance with RSA encryption, even if a standard dedicated chip is used. That is, the processing time of the RSA encryption unit 16 that executes the encrypting process in accordance with RSA encryption is several seconds. In addition, the processing time of the RSA decryption unit 31, which is described later, is also several seconds since the RSA decryption unit 31 executes decryption in accordance with RSA encryption.

Also, in order for the projector 2 to decrypt a predetermined portion (such the predetermined frame data) included in the AES-encryption data 53 (the stream data), it is necessary to provide an AES key 51-D (the AES key 51-E restored by the RSA decryption unit 31) corresponding to the AES key 51-E used in the encrypting process on the predetermined portion.

Accordingly, if the RSA encryption unit 16 performs the encrypting process on one LEKP (one AES key 51-E) in accordance with RSA encryption, and outputs the resultant data as the RSA data 55, an updating period in which the AES key 51-E is updated by the AES-key generating unit 14 is dependent on a processing time for the encrypting process and decrypting process in accordance with RSA encryption, that is, a processing time of the RSA encryption unit 16 and the RSA decryption unit 31. For example, in this case, the processing time is approximately several seconds. Thus, considering security, approximately one minute is employed as the updating period of the AES key 51-E by the AES-key generating unit 14.

However, in order for the transmitting/receiving system in FIG. 1 to be highly secure, it is preferable that, for one AV data item (stream data), as many AES keys 51-E as possible be exchanged. In other words, it is preferable that the updating period of the AES key 51-E by the AES-key generating unit 14 be as shorter as possible.

Accordingly, the present inventor has created the following technique in order for the updating period of the AES key 51-E by the AES-key generating unit 14 to be as shorter as possible.

In other words, if the RSA encryption unit 16 performs the encrypting process on one LEKP (one AES key 51-E) in accordance with RSA encryption, and outputs the resultant data as the RSA data 55, since one LEKP is 304-bit (38-bytes) data, the RSA encryption unit 16 performs padding on the remaining 1744 (=2048−304) bits before performing the encrypting process in accordance with RSA encryption. Therefore, it may be said that the padding data of 1744 bits is unnecessary. As shown in FIG. 6, in the technique, after the area for 1744 bits unnecessarily used as padding data is substituted by not only one LEKP(1) but also other LEKP(2) to LEKP(6), that is, after data in which LEKP(1) to LEKP(6) are consecutively arranged is generated, the encrypting process is performed on the data in accordance with RSA encryption. In other words, in this technique, the data having the structure shown in FIG. 6 is encrypted in accordance with RSA encryption, and the resultant data is output as the RSA data 55 in FIG. 1. This technique is hereinafter referred to as the "plural key encryption technique".

According to the plural key encryption technique, padding data (the portion bearing "PADDING" in FIG. 6) occupies only 28 bytes. In addition, six LEKPs can be simultaneously transmitted to the projector 2 at the receiving end. Thus, the updating period of the AES key 51-E by the AES-key generating unit 14 can be set to be six times that in the case of transmitting one LEKP. Specifically, for example, in a case in which the updating period in the case of transmitting one LEKP is one minute as described above, by employing the technique, 1/6 of the one minute, that is, ten seconds, can be set as the updating period. In this case, there is no change in the time necessary for arithmetic operations of the encrypting process and decrypting process in accordance with RSA encryption, regardless of employment of the technique. Thus, security of content (AV data) can be simply enhanced.

Figure 7:
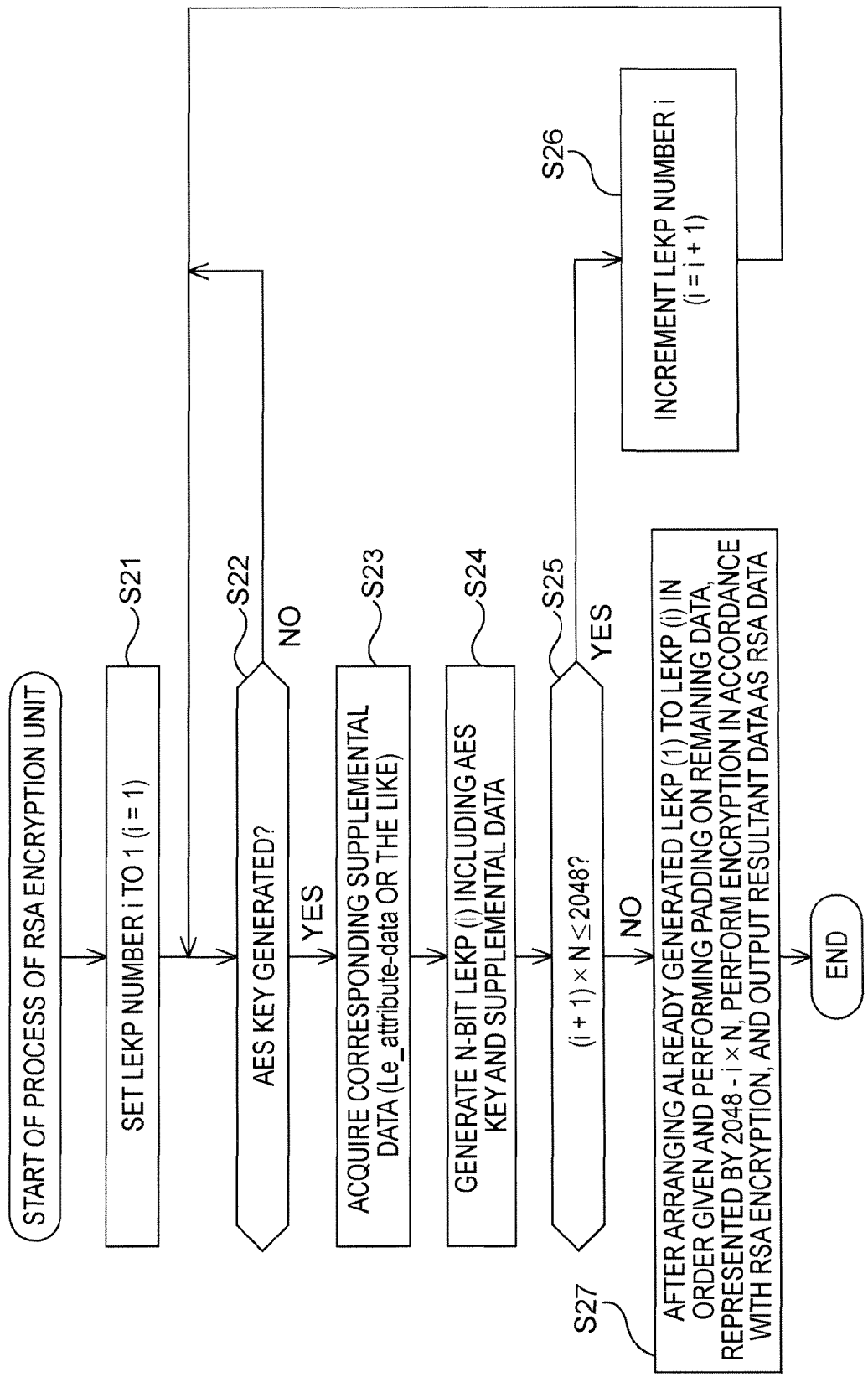
FIG. 7 is a flowchart illustrating an example of a process of the RSA encryption unit in the cinema server in FIG. 1.

In this embodiment, the plural key encryption technique is applied to the RSA encryption unit 16, whereby the RSA encryption unit 16 can execute, for example, a process in accordance with the flowchart shown in FIG. 7. FIG. 7 is a flowchart which shows an example of a process for realizing the technique and which shows an example of a process of the RSA encryption unit 16.

In step S21, the RSA encryption unit 16 sets LEKP number i to one (i=1).

In step S22, the RSA encryption unit 16 determines whether the AES key 51-E has been generated (whether the AES key 51-E has been supplied after being generated).

If, in step S22, it is determined that the AES key 51-E has not been generated yet, the process returns to step S22, and the RSA encryption unit 16 determines again whether the AES key 51-E has been generated. In other words, until the next AES key 51-E is generated, the RSA encryption unit 16 repeatedly performs the determination in step S22, whereby the RSA encryption unit 16 sets it to be on standby.

After the next AES key 51-E is generated, the result of the determination in step S22 is affirmative. Thus, the process proceeds to step S23.

In step S23, the RSA encryption unit 16 acquires corresponding supplemental data (such as Le_attribute_data 56-E).

In step S24, the RSA encryption unit 16 generates N-bit LEKP(i) including the AES key 51-E and the supplemental data, where N represents an integer equal to 2048 or less, and, in this embodiment, N=304.

In step S25, the RSA encryption unit 16 determines whether (i+1)×N≦2048.

If, in step S25, it is determined that (i+1)×N≦2048, that is, in a case up to i=5 since N=304 in this embodiment, the process proceeds to step S26.

In step S26, the RSA encryption unit 16 increments LEKP number i by one (i=i+1).

After that, the process returns to step S22, and the subsequent steps are repeatedly performed. Specifically, until the value represented by (i+1)×N exceeds 2048, a loop of steps S22 to S26 is repeatedly executed. Whenever the loop of steps S22 to S26 is executed at a time, one LEKP(i) is generated.

When the value represented by (i+1)×N exceeds 2048 (when LEKP (1) to LEKP (6) are generated N=304 in this embodiment), the result of determination in step S25 is negative, and the process proceeds to step S27.

After, in step S27, the RSA encryption unit 16 arranges already generated LEKP (1) to LEKP (i) in the order given, and performs padding on the remaining data represented by 2048-i×N, the RSA encryption unit 16 performs the encrypting process on (the data having the structure shown in FIG. 6 in this embodiment) the obtained data in accordance with RSA encryption, and outputs the resultant data as the RSA data 55.

In such a manner, as the result of performing step S27, the RSA data 55 is provided from the RSA encryption unit 16 to the superimposition unit 18. Then, processing of the RSA encryption unit 16 finishes.

The cinema server 1 at the transmitting end (encrypting side) in the transmitting/receiving system in FIG. 1 has been described. Next, the projector 2 at the receiving end (decrypting end) is described below.

In the example in FIG. 1, the projector 2 includes the RSA-data extracting unit 21 to the presentation control unit 27.

The RSA-data extracting unit 21 acquires the RSA-data-superimposed encrypted AV data 57 transmitted from the cinema server 1 through the superimposition unit 18, extracts the RSA data 55 from the RSA-data-superimposed encrypted AV data 57, and supplies the extracted RSA data 55 to the main control unit 22. Also, the RSA-data extracting unit 21 provides the AV-data decryption unit 26 to the AV-data decryption unit 26. The RSA-data extracting unit 21 provides the AES-input generating unit 24 with some data items (such as Line Number), which serve as elements of an AES Input 52-D (the restored AES input 52-E).

The main control unit 22 controls various types of operations (processes) by exchanging various types of information used in the projector 2.

For example, by providing the RSA data 55 provided from the RSA-data extracting unit 21 to the RSA decryption section 31 in the security chip 23, the main control unit 22 controls a decrypting process of the RSA decryption section 31 in accordance with RSA by providing the RSA data 55 provided from the RSA-data extracting unit 21 to the RSA decryption section 31 in the security chip 23.

In addition, as described later, as the result of the decrypting process of the RSA decryption section 31 on the RSA data 55, the AES key 51-D (the restored AES key 51-E) and Le_attribute_data 56-D (the restored Le_attribute_data 56-E) are output. Accordingly, the main control unit 22 controls a generating process (described later) for generating AES-decryption data 62 by acquiring the AES key 51-D and the Le_attribute_data 56-D and providing the AES key 51-D to the AES-decryption-data generating unit 25 while providing the Le_attribute_data 56-D to the AES-input generating unit 24.

For example, as described above, after the cinema server 1 issues the public-key request 71, the SM 3 receives the public-key request 71 and issues the public-key request 72. Accordingly, in response to the public-key request 72, the main control unit 22 acquires and provides the public key 54, which is stored in the public key 54, to the SM 3. The public key 54 is transferred from the SM 3 to the cinema server 1, and is used in the encrypting process of the RSA encryption unit 16 in accordance with the RSA encryption.

The security chip 23 is also called the "TPM (Trusted Platform Module)", and has, for example, the following first to fourth basic functions as basic functions for realizing security and privacy.

The first basic function represents a function for verifying the validity of a platform, that is, a function for verifying whether the platform is authentic and complies with TCG (trusted computing group).

The second basic function represents a function for observing integrity, that is, a function for checking whether hardware and software have not been falsified.

The third basic function represents an encryption key protecting functions, that is, in this embodiment, a function for preventing the secret key 61, which combines with the public key 54 to form a pair, from leading out of the security chip 23. Details of the third basic function are described later with reference to FIG. 8.

The fourth basic function represents an encrypting function (function based on an encryption library), that is, in this embodiment, a function for executing a decrypting process in accordance with RSA encryption (2048 bits).

To realize the fourth basic function, in the example in FIG. 1, the RSA decryption section 31 is provided in the security chip 23. The RSA decryption section 31 performs, on the RSA data 55 from the main control unit 22, a decrypting process using the secret key 61, which combines with the public key 54 for generating the RSA data 55 to form a pair. The RSA decryption section 31 temporarily stores the resultant data, and provides the temporarily stored data to the main control unit 22. Specifically, the data obtained by the above-described decrypting process of the RSA decryption section 31 is, for example, in this embodiment, the data having the above-described structure shown in FIG. 6. Accordingly, with desired timing, the main control unit 22 notifies the RSA decryption section 31 which of LEKP (1) to LEKP (6) the main control unit 22 needs. Then, the RSA decryption section 31 provides the main control unit 22 with data, such as the AES key 51-D, the Le_attribute_data 56-D, included in the LEKP specified in this notification among LEKP (1) to LEKP (6).

The AES-input generating unit 24 is a block of the projector 2 which corresponds to the AES-input generating unit 15 of the cinema server 1. Accordingly, the AES-input generating unit 24 generates the AES Input 52-D, whose elements include the Le_attribute_data 56-D provided from the main control unit 22 and data (such as Line Number) provided from the RSA-data extracting unit 21, that is, the AES-input generating unit 24 generates the AES Input 52-D corresponding to the AES input 52-E in the cinema server 1, and provides the AES Input 52-D to the AES-decryption-data generating unit 25.

The AES-decryption-data generating unit 25 is a block of the projector 2 which corresponds to the AES-encryption-data generating unit 13 in the cinema server 1. Accordingly, by using the AES Input 52-D from the AES-input generating unit 24 and the AES key 51-D from the main control unit 22, the AES-decryption-data generating unit 25 generates data (hereinafter referred to as "AES-decryption data 62") for directly decrypting (performing the decrypting process in accordance with AES encryption on) the encrypted AV data 56, and provides the AES-decryption data 62 to the AV-data decryption unit 26. In other words, the AES-decryption data 62 is decrypting data corresponding to the AES-encryption data 53.

The AV-data decryption unit 26 uses the AES-decryption data 62 from the AES-decryption-data generating unit 25 to perform the decrypting process on the encrypted AV data 56 from the RSA-data extracting unit 21, and outputs the resultant AV data (the restored AV data) to the presentation control unit 27.

It is noted that, instead of using the same AES-decryption data 62 for all the items of the encrypted AV data 56 as stream data, as described above, by using AES keys 51-D respectively corresponding to AES keys 51-E, which are updated in a predetermined updating period by the cinema server 1, that is, by using AES keys 51-D updated in a predetermined updating period, items of the AES-decryption data 62 are generated and used for corresponding portions of the encrypted AV data 56. Also, it is noted that, as described above, since a plurality of (in this embodiment, six) LEKPs can be included in the RSA data 55, the updating period is shorter than that used when one encrypted LEKP is included in the RSA data 55.

The presentation control unit 27 controls playback (movie presentation) of content corresponding to the AV data from the AV-data decryption unit 26. That is, for example, the presentation control unit 27 projects video images corresponding to the AV data on a screen, and controls a speaker unit to output audio corresponding to the AV data.

An operation of the transmitting/receiving system in FIG. 1, which has been described, is as follows.

Specifically, the projector 2 has a public key pair of a public key 54 and a secret key 61, and gives only the public key 54 of the public key pair to the cinema server 1 through the SM 3.

The cinema server 1 uses the public key 54 from the projector 2 to encrypt AV data whose confidentiality is to be protected.

Specifically, in this embodiment, one of common key cryptography systems, AES encryption having a feature in high speed of encrypting and decrypting processes, is employed as an encryption system for actually encrypting the AV data. To generate the AES-encryption data 53, which is AES encryption code, the AES-key generating unit 14 sequentially generates different AES keys 51-E in the predetermined updating period.

Accordingly, by using each of the sequentially generated AES keys 51-E and corresponding AES inputs 52-E from the AES-input generating unit 15, the AES-encryption-data generating unit 13 generates items of the AES-encryption data 53. In other words, the AES-encryption-data generating unit 13 sequentially updates the items of the AES-encryption data 53.

By using the sequentially updated items of the AES-encryption data 53, the AV-data encryption unit 12 performs the encrypting process on items of the AV data from the AV-data storage unit 11 in accordance with AES encryption in units of frames. The encrypted AV data 56 obtained by the encrypting process is provided from the AV-data encryption unit 12 to the superimposition unit 18.

In addition, the sequentially updated AES keys 51-E are subject to the encrypting process of the RSA encryption unit 16 in accordance with RSA encryption, with a predetermined number (within the range of 2048 bits for use in RSA encryption) of (six in this embodiment) AES keys 51-E used as a unit. That is, in this embodiment, the encrypting process in accordance with RSA encryption is performed by using the data having the structure in FIG. 6 as a unit. The public key 54 of the projector 2 is used in this encrypting process. The RSA data 55 obtained by this encrypting process is provided from the RSA encryption unit 16 to the superimposition unit 18.

In such a manner, the sequentially updated AES key 51-E are encrypted by using, as a unit, predetermined number of (six in this embodiment) AES keys 51-E. Thus, as described above, as a result, encrypted data items can be transmitted to the projector 2, with a predetermined number of items used as a unit. Accordingly, the updating period of each AES key 51-E in the AES-key generating unit 14 can be shortened, so that an advantage can be obtained in that a highly secure system can be built.

The superimposition unit 18 superimposes the RSA data 55 on the encrypted AV data 56, and transfers the resultant RSA-data-superimposed encrypted AV data 57 to the projector 2.

An operation of the projector 2 is briefly described below (each block is not described).

Specifically, the projector 2 extracts the RSA data 55 from the RSA-data-superimposed encrypted AV data 57, and decrypts the RSA data 55 by using the secret key 61 (the secret key 61 which pairs up with the public key 54 used in generation of the RSA data 55) in the security chip 23. This results in restoring the data having the structure in FIG. 6 in this embodiment.

Accordingly, with predetermined timing, the projector 2 specifies one LEKP from among LEKP (1) to LEKP (6) included in the data having the structure in FIG. 6 which corresponds to a portion (frame) to be decrypted of the AES-decryption data 62, and acquires pieces of information, such as the AES key 51-D and the Le_attribute_data 56-D, from the specified LEKP. On the basis of the pieces of information, the projector 2 generates the AES-decryption data 62.

The projector 2 uses the AES-decryption data 62 to perform the decrypting process on the portion (frame) to be decrypted of the AES-decryption data 62 in accordance with AES encryption, and plays back a predetermined portion (frame) of the resultant AV data. In other words, the projector 2 projects a predetermined scene of a movie.

As described above, content (AV data) is encrypted in accordance with AES encryption, and is transferred from the cinema server 1 to the projector 2. Therefore, if an AES key 51-E that is a common key used in the AES encryption is stolen, the encrypted content can easily be decrypted. That is, a problem occurs in that content can be easily taken. In other words, a system that directly transmits the AES key 51-E to a receiving end (decrypting side) has a problem of very low security.

Accordingly, in the transmitting/receiving system in FIG. 1, the system security is enhanced by performing, on the AES key 51-E, an encrypting process in accordance with a common key cryptography system called "RSA encryption" having a very low possibility of being broken.

Specifically, as described above, in the transmitting/receiving system in FIG. 1, by using the public key 54 of the projector 2 at the receiving end (decrypting side) to perform encrypting process on a set of six LEKPs including the AES key 51-E in accordance with RSA encryption, the cinema server 1 at the transmitting end (encrypting side) can transmit the RSA data 55 to the projector 2.

When the projector 2 decrypts the RSA data 55, the projector 2 can use the secret key 61 in the security chip 23 included therein, that is, the secret key 61 that pairs up with the public key 54 used in performing the encrypting process on the RSA data 55.

The secret key 61 can be stored in a security chip of the related art. However, in this case, its security depends on a management method. To create this management method, by allowing only a particular person or device to handle a public key pair (the secret key 61 and the public key 54 in this case) in the security chip, the secret key 61 can be prevented from leaking out. In this management method of the related art, due to the existence of the person or device, the security of protection of the secret key 61 does not reach 100%. In other words, a possibility that the secret key 61 may be stolen is not zero. Accordingly, if the secret key 61 is stolen, the RSA data 55 can be easily decrypted and the AES key 51-D can be taken (the AES key 51-E is restored), and, in addition, by using the AES key 51-D, the encrypted AV data (encrypted content) can be easily decrypted. In other words, a problem occurs in that content is easily taken.

Accordingly, in order that a possibility of stealing of the secret key 61 may be close to zero, the present inventor has created a technique in which, for a device configuration of security chip, by providing, in a security chip, a nonvolatile memory (the nonvolatile memory 32 in FIG. 8, which is described later) capable of storing a plurality of pairs of keys (a public key pair of the secret key 61 and the public key 54 in the example in FIG. 1) and a certificate, keys (for example, the secret key 61 for use in various types of calculation that needs decryption of the RSA data 55 by the RSA decryption section 31) for use in predetermined calculation, a public key (for example, the public key 54 in the example in FIG. 1) that may be reported to higher software or the like (for example, software that is executed by the main control unit 22, the SM 3, or the like, in the example in FIG. 1), and its information (certificate) are managed by using their addresses so as to be called at any time.

In the security chip to which the technique in the present invention is applied, an encryption library (e.g., the RSA decryption section 31 in FIG. 1) realized by the technique, such as RSA or ECC (Elliptic Curve Cryptosystem), is controlled in a predetermined protocol by a higher program (e.g., the main control unit 22 or a program executed by the SM 3 in FIG. 1), and, after the encryption library performs predetermined processing, it notifies the higher program of the result of the processing, or the like. It is to be noted that the security chip in the embodiment of the present invention differs from a security chip of the related art in that it can perform time-divisional encrypting or decrypting processing on a plurality of keys. Although time management itself is performed by the higher program or the like, by sophisticatedly using the encryption library of the security chip, its performance can be enhanced.

In addition, regarding a certificate management method, in the related art, for example, a method in which a security system performs certificate management is employed. However, in this embodiment, a method in which the security chip 23 stores a certificate therein is employed. This is based on the following reason. Specifically, since, in the related art, when certificate information is changed due to security chip exchange or the like, a security system requests a certificate authority to issues a certificate and the security system stores the certificate, it is necessary for the security system to include a nonvolatile memory device. Unlike that, since the security chip in this embodiment has a configuration capable of storing the certificate even if a power supply is not provided, even in a case such as when the security chip is exchanged, by only notifying the security system of a new public key, the security chip can be controlled to immediately operate. Accordingly, on the basis of this reason, the method in which the security chip 23 in this embodiment stores the certificate therein is employed.

Figure 8:
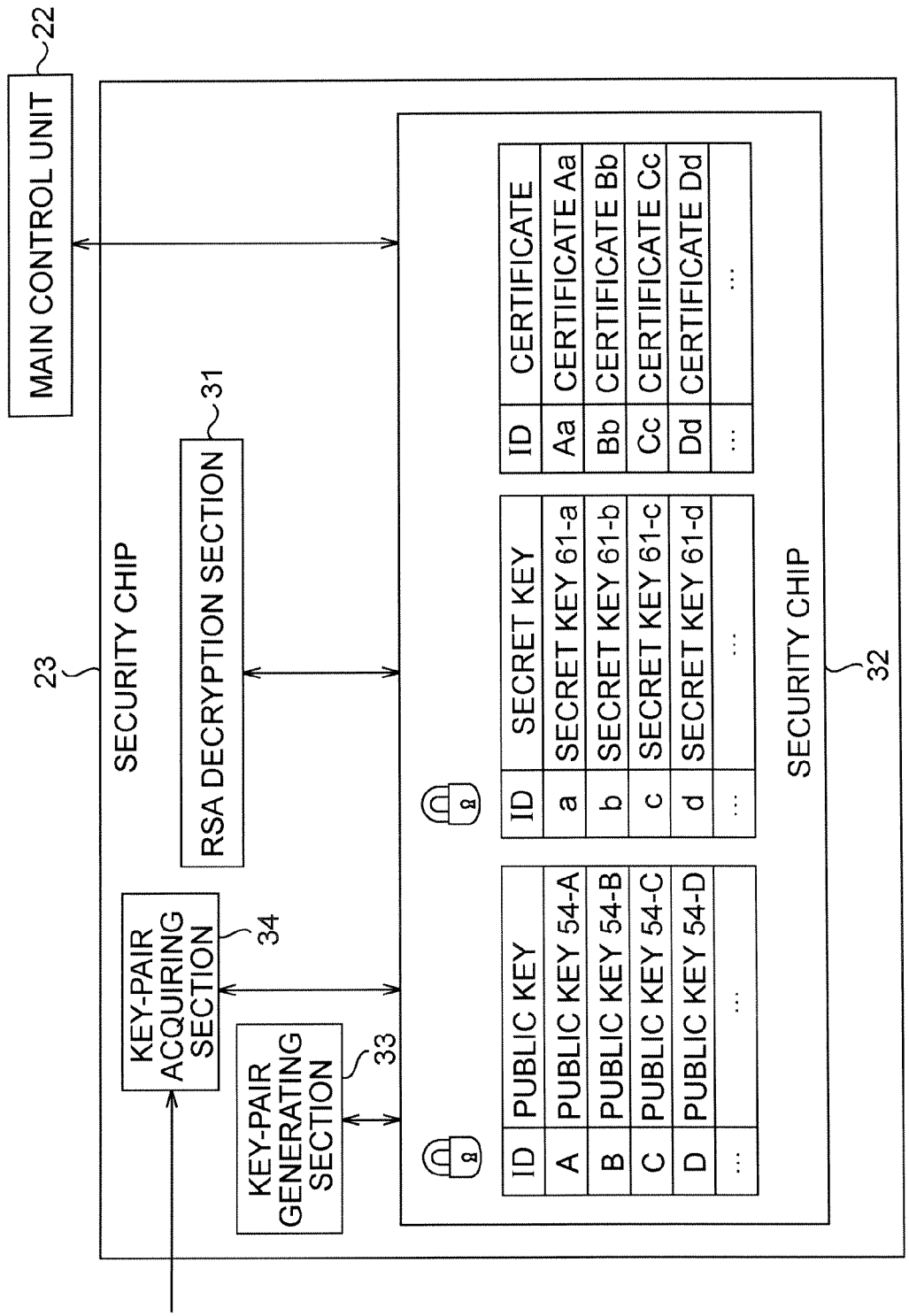
FIG. 8 is a block diagram showing a detailed example of the configuration of a security chip in the projector shown in FIG. 1.

An example of the above security system in the embodiment of the present invention is the security chip 23 included in the projector 2, and a detailed example of the configuration of the security chip 23 is shown in FIG. 8.

In the example in FIG. 8, the security chip 23 includes, in addition to the above-described RSA decryption section 31, a nonvolatile memory 32 for storing pairs of public keys (the public key 54 and the secret key 61), a key-pair generating unit 33 for generating and storing a public key pair in the nonvolatile memory 32, and a key-pair acquiring section 34 for acquiring and storing an externally supplied public pair in the nonvolatile memory 32.

However, in the case of highly enhancing the system security, the key-pair acquiring section 34 may be omitted. This is because, when a public key pair including a secret key 61 is externally supplied in a state in which the secret key 61 is known, the secret key 61 is not made secret even if the public key pair is stored.

Blocks in the nonvolatile memory 32 shown in FIG. 8 show an imaged register map of the nonvolatile memory 32.

Specifically, at a left end of the nonvolatile memory 32, a storage area for one or more public keys 54 (only public keys 54-A to 54-D among the public keys 54) is shown. The one or more public keys 54 are stored at predetermined addresses in the nonvolatile memory 32 so as to be associated with IDs (only IDs A to D that are IDs of the public keys 54-A to 54-D are shown) which specify the one or more public keys 54. Although an ID assigning manner is not particularly limited, in this embodiment, for example, addresses are used as IDs, whereby the one or more public keys 54 are managed on the basis of the addresses.

Each of the one or more public keys 54 can be extracted by accessing the security chip 23 from the exterior (e.g., the main control unit 22). However, any of the one or more public keys 54 is designed so as not to be processed.

In the center of the nonvolatile memory 32, a storage area for one or more secret keys 61 (only secret keys 61-*a* to 61-*d* among the one or more secret keys 61) is shown. The one or more secret keys 61 are stored at predetermined addresses in the nonvolatile memory 32 so as to be associated with IDs (only IDs a to D that are IDs of the secret keys 61-*a* to 61-*d* are shown) which specifies the one or more secret keys 61. An ID assigning manner is not particularly limited. In this embodiment, for example, addresses are used as IDs, whereby the one or more secret keys 61 are managed on the basis of the addresses.

Each of the one or more secret keys 61 is stored in the nonvolatile memory 32 for use so as to pair up with a public key 54 at all times. In the example in FIG. 8, a pair of the public key 54-A and the secret key 61-*a*, a pair of the public key 54-B and the secret key 61-*b*, a pair of the public key 54-C and the secret key 61-*c*, and a pair of the public key 54-D and the secret key 61-*d* are shown as examples of public key pairs.

Figure 9:
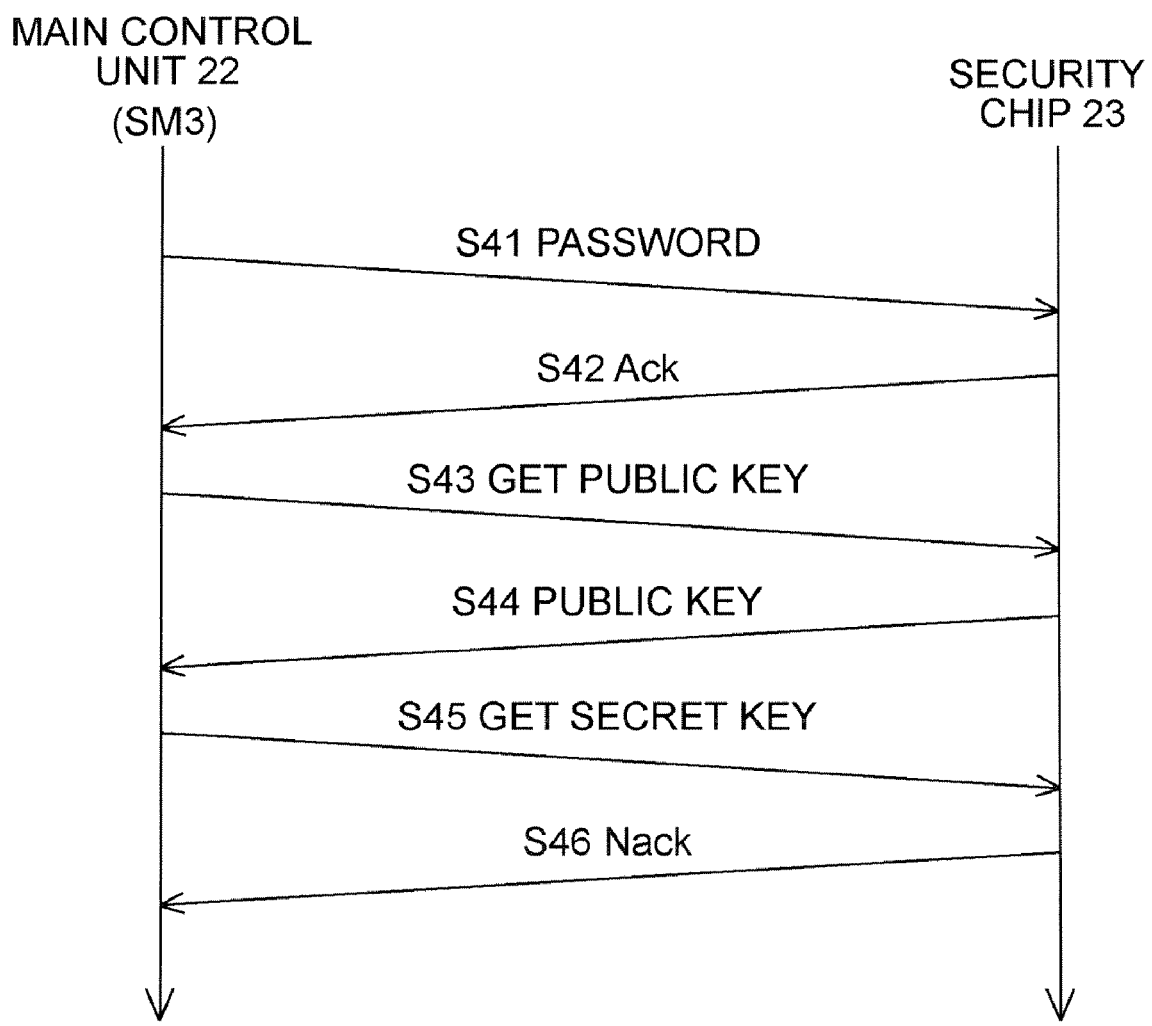
FIG. 9 is an illustration of an example of a process realized by a protocol of the security chip shown in FIG. 8.

Any of the one or more secret keys 61 does not respond to any external command and does not have any read-only command. This can also prevent any one of the secret keys 61 from leaking out. This is further described with reference to FIG. 9. Specifically, FIG. 9 is an illustration of an example of relationship in processing between the security chip 23 and the exterior (the main control unit 22 or SM 3 shown in FIG. 1 in the example in FIG. 9). In other words, FIG. 9 is an illustration of an example of a process realized by the protocol of the security chip 23.

In step S41, the main control unit 22 or SM 3 (for brevity of description, only the main control unit 22 is mentioned) notifies the security chip 23 of a password for establishing connection.

When the security chip 23 is notified in step S41 of the password, which is authentic, the security chip 23 responds to the main control unit 22 with an acknowledgement (Ack) representing establishment of the connection.

Also, in a protocol for the connection, a protect level can be changed various versions of protocols may be employed such as providing a protocol that uses a password in a debug mode to deeply inspect the interior of the security chip 23, and opening to the public of a protocol for only activating an application only a user can use.

After the connection is established, for example, in step S43, the security chip 23 transmits, to the security chip 23, "Get Public Key" as a common for acquiring the public key 54.

In this case, as described above, provision of the public key 54 from the security chip 23 to the exterior is permitted. Thus, if the security chip 23 is configured to receive "Get Public Key", for example, step S44, is performed. Specifically, in step S44, the security chip 23 acquires a public key 54 corresponding to an ID (address) specified by "Get Public Key" from among the one or more public keys 54 stored in the nonvolatile memory 32, and provides the acquired public key 54 to the main control unit 22.

In addition, for example, in step S45, the main control unit 22 transmits, to the security chip 23, "Get Secret Key" that is a command for acquiring a secret key 61.

In this case, as described above, provision of the secret key 61 from the security chip 23 to the exterior is inhibited, that is, the security chip 23 is configured so as not to receive any command for requesting acquisition of the secret key 61 including "Get Secret Key". Thus, for example, step S46 is performed. That is, in step S46, the security chip 23 sends no response to the main control unit 22. Since the security chip 23 does not prepare Ack for "Get Secret Key", the security chip 23 does not respond to "Get Secret Key". In order that this point may be shown, in step S46 in FIG. 9, Nack (no acknowledgement) is shown.

Referring back to FIG. 8, at a right end of the nonvolatile memory 32, a storage area for certificates certifying security of the public key pairs (the secret keys 61 and the public keys 54) shown at the left end of FIG. 8 is shown. In the example in FIG. 8, certificate Aa of the public key pair of the public key 54-A and the secret key 61-*a*, certificate Bb of the public key pair of the public key 54-B and the secret key 61-*b*, certificate Cc of the public key pair of the public key 54-C and the secret key 61-*c*, and certificate Dd of the public key pair of the public key 54-D and the secret key 61-*d* are shown as examples of certificates.

A method for operating the certificates is, for example, as follows. That is, when a new public key pair is issued, specifically, for example, in the example in FIG. 8, when a public key pair acquired by the key-pair acquiring section 34 or a public key pair generated by the key-pair generating section 33 is newly stored in the nonvolatile memory 32, the security chip 23 requests a certificate authority to issue a certificate by reporting a public key 54 of the newly stored public key pair to the certificate authority, and the security chip 23 stores the certificates in the nonvolatile memory 32 so as to be associated with the newly stored public key pair.

The security chip 23 used in the transmitting/receiving system in FIG. 1, that is, the security chip 23 included in the projector 2, has been described as an example of a security chip in an embodiment of the present invention.

However, a system to which the security chip in an embodiment of the present invention is applied is not particularly limited to the transmitting/receiving system in FIG. 1. The security chip in the embodiment of the present invention may be applied to a system (the definition of the system is described later) that employs public key encryption as an encryption system, that is, a system that uses public key pairs of public keys and secret keys.

By applying the security chip in the embodiment of the present invention, the following first to fourth advantages can be obtained.

In the first advantage, since the security chip in the embodiment of the present invention has a mechanism that prevents a secret key from being taken out, a risk that encrypted content (such as the encrypted AV data 56 in the example of FIG. 1) to be protected may be decrypted by a malicious third party can be minimized. The first advantage is generated from the fact that a person or device generating a public key pair has no way of knowing the secret key 61 stored in the nonvolatile memory 32. Accordingly, it may be said that the first advantage protects the transmitting/receiving system from a risk that a secret key may leak out. That is, after all, the first advantage is that information, such as content encrypted by using a public key of a public key pair generated and stored in the security chip in the embodiment of the present invention, can be decrypted only by the security chip in the embodiment of the present invention.

In the second advantage, since the security chip in the embodiment of the present invention stores a plurality of key pairs and can time-divisionally process the pairs, in the case of meeting the following need, it is preferable in cost and circuit mounting to employ the security chip in the embodiment of the present invention than that of the related art.

In general, in many cases, in an application that uses public key encryption, real-time functionality is not expected for an encrypting or decrypting process. In other words, in many cases, public key encryption is employed in an application in which no problem occurs even if a processing time needs several seconds. Also, such an application often emphasizes reliability. Accordingly, since this application is less used in such a manner that the security chip is frequently accessed while the system is operating, this application has a need to use PKI (public key infrastructure). Although, when it is necessary to meet the above need, if a different public key pair is necessary, in the case of using a security chip of the related art, a different security chip needs to be provided, in the case of using the security chip in the embodiment of the present invention, the different security chip does not need to be provided and a different public key pair can be simply generated and operated. Therefore, it is preferable in cost and circuit mounting to employ the security chip in the embodiment of the present invention than that of the related art. In addition, it is necessary to acquire certificates in units of public key pairs. However, no cumbersomeness increases, so that the acquisition is not so problematic.

In the third advantage, since the security chip in the embodiment of the present invention stores a plurality of key pairs and can time-divisionally process the key pairs, even if an encryption system used by the security chip differs, a higher system for controlling the security chip may create a corresponding program, and a calculation library (such as an encryption library) in the security chip in the embodiment of the present invention can be efficiently used.

As described above, the second and third advantages are generated on the basis of the fact that the security chip in the embodiment of the present invention can store a plurality of key pairs. To obtain these advantages, permission or inhibition of a secret key to the exterior is not particularly problematic. That is, if a security chip (not shown) having a function for permitting external provision of a secret key to the security chip in the embodiment of the present invention is realized, the second and third advantages themselves can be obtained. In other words, the second and third advantages can be obtained by any type of security chip that can store a plurality of key pairs irrespective of permission and inhabitation of provision of a secret key to the exterior of the security chip. When considering that the second and third advantages are not obtained by a security chip of the related art, it may be said that the type of security chip (even if it has a function of permitting external provision of a secret key) is one of security chips which are based on embodiments of the present invention and which has not existed.

In the fourth advantage, even if an application in which a secret key is used for signature is used, a risk that signature data may be falsified due to leaking of the secret key is extremely reduced (the falsification is substantially difficult).

A transmitting/receiving system to which an embodiment of the present invention is applied is not limited to the above-described example shown in FIG. 1, but may have various forms.

Specifically, for the transmitting/receiving system to which the embodiment of the present invention is applied, it is sufficient to include the following transmitting apparatus and receiving apparatus, and may have any form.

In other words, for a transmitting apparatus in a transmitting/receiving system to which an embodiment of the present invention is applied, it is only necessary to transmit, to a different apparatus, first encrypted data obtained by encrypting stream data including a plurality of consecutive unit data items in accordance with a first encryption technique prescribing that, when the stream data is sequentially encrypted for each unit data item, a plurality of keys used for encrypting the unit data items are updated on the basis of predetermined rules.

In addition, for a receiving apparatus in a transmitting/receiving system to which an embodiment of the present invention is applied, it is only necessary to receive and decrypt the first encrypted data transmitted from the transmitting apparatus in accordance with a first decryption technique corresponding to the first encryption technique by using a plurality of keys used for generating the first encrypted data.

An embodiment of the present invention is applicable to any transmitting/receiving system that includes the above transmitting apparatus and receiving apparatus as at least some of elements.

In this case, the above-described technique for encrypting a plurality of keys can be realized by, for example, the following manner.

In other words, the transmitting apparatus may include a key encryptor configured to output second encrypted data obtained by generating data including keys whose number is represented by an integer value equal to one or greater among the plurality of keys used for generating the first encrypted data, and encrypting the generated data in accordance with a second encryption technique, and a key transmitter configured to transmit the second encrypted data output from the key encryptor to the receiving apparatus.

In addition, the receiving apparatus may include a key receiver configured to receive the second encrypted data transmitted from the key transmitter of the transmitting apparatus, and a key decryptor configured to decrypt the second encrypted data received by the key receiver in accordance with a second decryption technique corresponding to the second encryption technique.

In this case, forms in which the key encryptor, the key transmitter, the key receiver, and the key decryptor are realized are not particularly limited.

The transmitting/receiving system to which the embodiment of the present invention is applied can produce the following advantages.

In many cases, in information transmission and reception using public key encryption, a calculation time characteristic in PKI is restriction. For example, to securely send content by using an application handling video and audio, security is more enhanced by directly using PKI than by using common key encryption. However, in general, in technology of the related art, public key encryption is almost not used in an application necessary for having real-time functionality since, compared with common key encryption, a processing time necessary for encryption and decryption is extremely long.

Regarding a recent system for encrypting an decrypting audio/video content (the AV data in FIG. 1), a mechanism which uses common key encryption for a technology for directly encrypting and decrypting the content, and which uses public key encryption to send information of keys used in the common key encryption to a receiving end has been proposed. This mechanism is employed in the above-described transmitting/receiving system in FIG. 1. That is, in the example in FIG. 1, AES encryption is employed as common key encryption, and RSA encryption is employed as public key encryption.

In a system employing the mechanism, in order to decrypt encrypted content (the encrypted AV data 56 in FIG. 1), an information stealer needs to find a common key (the AES key 51-E in FIG. 1) used in encryption, and an operation of finding only one common key needs a lot of time. Specifically, when the number of types of common keys to be decrypted increases, large amounts of time are necessary. In other words, the less the number of types of common keys, that is, the longer an common key updating period, the higher a possibility that a common key may be stolen. Consequently, a possibility that the encrypted content may be stolen (decrypted) increases.

Accordingly, the transmitting/receiving system to which the embodiment of the present invention is applied has the above-described characteristic configuration, whereby a technology in which shortening of a common key updating period (i.e., generation of as many common keys as possible) enhances the security of content can be supported. That is, in the transmitting/receiving system to which the embodiment of the present invention is applied, when a common key (the AES key 51-E in FIG. 1) is transmitted for content protection to a receiving end (the projector 2 in FIG. 1) by using public key encryption (RSA encryption in FIG. 1) in accordance with an encryption system having high confidentiality, not only one common key, but also a plurality of common keys (six AES keys 51-E in the above-described example) are collectively encrypted by using public key encryption, and the resultant encrypted data (the RSA data 55 in FIG. 1) can be transmitted to the receiving end. This makes it possible for the receiving end to use a single calculation process to extract a plurality of common keys included in encrypted data, even if public key encryption, which needs a lot of time for calculation for decryption, is used. Consequently, as a system for protecting content, performance can be enhanced. This advantage can be produced by the transmitting/receiving system to which the embodiment of the present invention is applied.

The above-described consecutive processing may be executed either by hardware or by software. When the above-described consecutive processing is executed by software, a program forming the software is installed from a program storage medium to a computer built into dedicated hardware or to, for example, a multi-purpose personal computer that can execute various functions by installing various programs.

Figure 10:
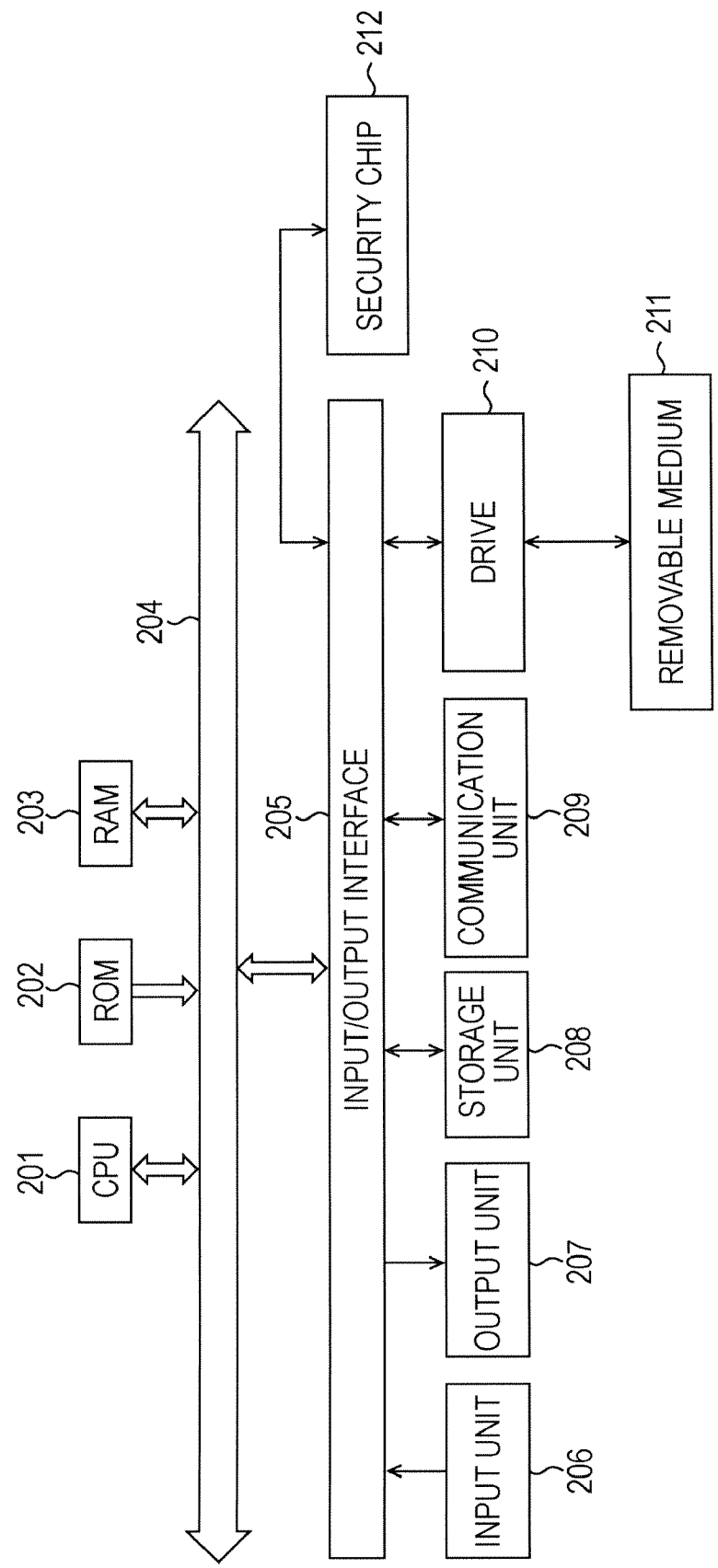
FIG. 10 is a block diagram showing an example of the configuration of a personal computer for executing a program to which an embodiment of the present invention is applied.

FIG. 10 is a block diagram showing an example of the configuration of a personal computer for executing the above-described consecutive processing by using a program.

In FIG. 10, a CPU (central processing unit) 201 executes various types of processing in accordance with a program stored in a ROM (read-only memory) 202 or a program stored in a storage unit 208. A RAM (random access memory) 203 stores a program to be executed by the CPU 201, data, etc., if necessary. The CPU 201, the ROM 202, and the RAM 203 are connected to one another by a bus 204.

An input/output interface 205 is connected to the CPU 201 by the bus 204. An input unit 206 including a keyboard, a mouse, and a microphone, and an output unit 207 including a display and a speaker are connected to the input/output interface 205. The CPU 201 executes various types of processing in response to commands input from the input unit 206.

The storage unit 208 connected to the input/output interface 205 is formed by, for example, a hard disk drive, and stores the program to be executed by the CPU 201 and various types of data. A communication unit 209 communicates to an external apparatus through networks such as the Internet or a local area network.

In addition, the program may be stored in the storage unit 208 after being acquired through the communication unit 209.

When a removable medium 211, such as a magnetic disk, an optical disc, a magneto-optical disc, or a semiconductor memory, is loaded, a drive 210 connected to the input/output interface 205 drives the removable medium 211 to acquire a program and data recorded on the removable medium 211. The acquired program and data are transferred and stored in the storage unit 208, if necessary.

A security chip 212 connected to the input/output interface 205 is an example of the above-described security chip in the embodiment of the present invention.

Types of the program recording medium, which has a program recorded therein that is made executable by a computer after being installed into the computer include the removable medium 211 shown in FIG. 10, which is a package medium formed by one of a magnetic disk (including a flexible disk), an optical disc (CD-ROM (compact disc read-only memory) or DVD (digital versatile disc)), a magneto-optical disc, and a semiconductor memory, the ROM 202, in which a program is temporarily or eternally stored, and the storage unit 208, which includes a hard disk. Storing of the program to the program recording medium is performed by using a wired or wireless communication medium, such as a LAN, the Internet through the communication unit 209, which is an interface such as a router or a modem, if necessary.

In this specification, steps constituting a program recorded in the recording medium definitely include processing steps executed in a time-series manner in given order, and include processing steps which are executed in parallel or separately if they are not necessarily executed in a time-series manner.

In addition, in this specification, the system represents the entirety of a set of a plurality of apparatuses.

Furthermore, an embodiment of the present invention is applicable not only to the transmitting/receiving system in FIG. 1 but also to various systems. For example, although, in the example in FIG. 1, the RSA data 55 and the encrypted AV data 56 are transmitted simultaneously, that is, as the RSA-data-superimposed encrypted AV data 57, from the cinema server 1 at the transmitting end to the projector 2 at the receiving end, it is not necessary to simultaneously transmit the RSA data 55 and the encrypted AV data 56 at all times. In other words, an embodiment of the present invention is applicable to even a system in which the RSA data 55 is transmitted from the transmitting end to the receiving end through a transmission path different from that for the encrypted AV data 56.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitting/receiving system comprising:
a transmitting apparatus configured to transmit first encrypted data obtained by encrypting stream data including a plurality of consecutive unit data items in accordance with a first encryption technique, the first encryption technique prescribing that, when the stream data is sequentially encrypted for each unit data item, a plurality of keys to encrypt the unit data items are periodically updated according to predetermined rules, the transmitting apparatus including
a key encryptor configured to
output second encrypted data, the second encrypted data being obtained by generating M-bit data including at least one N-bit key from the plurality of keys used to generate the first encrypted data such that a total amount of N-bits of the at least one N-bit key is less than the generated M-bit data and any remaining bits of the M-bit data are padded, and
encrypt the generated M-bit data in accordance with a second encryption technique, and
a key transmitter configured to transmit the second encrypted data output from the key encryptor to the receiving apparatus; and
a receiving apparatus configured to receive and decrypt the first encrypted data in accordance with a first decryption technique corresponding to the first encryption technique by using the plurality of keys used to generate the first encrypted data, the receiving apparatus including
a key receiver configured to receive the second encrypted data transmitted from the key transmitter, and
a key decryptor configured to decrypt the second encrypted data in accordance with a second decryption technique corresponding to the second encryption technique, wherein
the key encryptor generates, as one information-data item, data including one Advanced-Encryption-Standard key and link-encryption-attribute data, and
the key transmitter transmits the second encrypted data to the receiving apparatus by transmitting data obtained by superimposing the second encrypted data on the first encrypted data.

2. A transmitting/receiving method for a transmitting/receiving system, the method comprising:
encrypting, at a transmitting apparatus, stream data including a plurality of consecutive unit data items in accordance with a first encryption technique, the first encryption technique prescribing that, when the stream data is sequentially encrypted for each unit data item, a plurality of keys to encrypt the unit data items are periodically updated according to predetermined rules;
transmitting, from the transmitting apparatus, first encrypted data to a receiving apparatus;
receiving and decrypting, at the receiving apparatus, the first encrypted data in accordance with a first decryption technique corresponding to the first encryption technique by using the plurality of keys used to generate the first encrypted data;
generating, at the transmitting apparatus, M-bit data including at least one N-bit key from the plurality of keys used to generate the first encrypted data such that a total amount of N-bits of the at least one M-bit key is less than the generated M-bit data and any remaining bits of the M-bit data are padded;
encrypting, at the transmitting apparatus, the generated M-bit data in accordance with a second encryption technique to generate second encrypted data;
transmitting the second encrypted data from the transmitting apparatus to the receiving apparatus;
receiving, at the receiving apparatus, the second encrypted data transmitted from the transmitting apparatus; and
decrypting, at the receiving apparatus, the received second encrypted data in accordance with a second decryption technique corresponding to the second encryption technique,
wherein
the generating includes generating, as one information-data item, data including one Advanced-Encryption-Standard key and link-encryption-attribute data, and
the transmitting includes transmitting the second encrypted data to the receiving apparatus by transmitting data obtained by superimposing the second encrypted data on the first encrypted data.

3. A transmitting apparatus that transmits to a receiving apparatus, the transmitting apparatus comprising:
a data encryptor configured to obtain first encrypted data by encrypting stream data including a plurality of consecutive unit data items in accordance with a first encryption technique prescribing that, when the stream data is sequentially encrypted for each unit data item, a plurality of keys to encrypt the unit data items are periodically updated according to predetermined rules;
a key encryptor configured
to output second encrypted data, the second encrypted data being obtained by generating M-bit data including i N-bit keys, where i represents an integer value equal to one or greater, from the plurality of keys used to generate the first encrypted data such that a total amount of N-bits of the i N-bit keys is less than the generated M-bit data and any remaining bits of the M-bit data are padded, and
to encrypt the generated M-bit data in accordance with a second encryption technique; and
a key transmitter configured to transmit the second encrypted data to the receiving apparatus,
wherein
the key encryptor generates, as one information-data item, data including one Advanced-Encryption-Standard key and link-encryption-attribute data, and
the key transmitter transmits the second encrypted data to the receiving apparatus by transmitting data obtained by superimposing the second encrypted data on the first encrypted data.

4. The transmitting apparatus according to claim 3, wherein
the second encryption technique uses RSA encryption using 2048-bit data, and
the key encryptor generates data having a total of 2048 bits as data to be encrypted in accordance with the RSA encryption by
generating i N-bit information-data items, respectively, including at least the i keys, where
N represents an integer value equal to 2048 or less, and represents an integer value satisfying the expression i×N≦2048,
arranging the i N-bit information-data items in predetermined order, and
arranging, following the i N-bit information-data items, padding data having (2048-i×N) bits.

5. The transmitting apparatus according to claim 4, further comprising:
an Advanced-Encryption-Standard-key generator configured to generate Advanced-Encryption-Standard keys as the plurality of keys in accordance with the number of keys included in the second encrypted data, the first encryption technique using the Advanced Encryption Standard;
an Advanced-Encryption-Standard-input generator configured to generate an Advanced-Encryption-Standard input including the link-encryption-attribute data; and
a stream encryptor configured to output the first encrypted data generated such that the stream data is encrypted using the Advanced-Encryption-Standard keys and the Advanced-Encryption-Standard input.

6. The transmitting apparatus according to claim 5, wherein
each information-data item is formed as a 304-bit link-encryption-key payload, and
the key encryptor generates, as data to be encrypted in accordance with the RSA encryption, data having 2048 bits by
generating and arranging six link-encryption-key payloads in predetermined order, where i is equal to six, and
arranging, following the six link-encryption-key payloads, 224-bit padding data.

7. A transmitting method to cause a transmitting apparatus to transmit first encrypted data to a receiving apparatus, the method comprising:
obtaining, at a data encryptor, first encrypted data by encrypting stream data including a plurality of consecutive unit data items in accordance with a first encryption technique prescribing that, when the stream data is sequentially encrypted for each unit data item, a plurality of keys used to encrypt the unit data items are periodically updated according to predetermined rules;

generating, at a key encryptor, M-bit data including at least one N-bit key from the plurality of keys used to generate the first encrypted data such that a total amount of N-bits of the at least one N-bit key is less than the generated M-bit data and any remaining bits of the M-bit data are padded;

encrypting, at the key encryptor, the generated M-bit data in accordance with a second encryption technique to generate second encrypted data; and transmitting, from a transmitting apparatus, the generated second encrypted data to the receiving apparatus, wherein the generating includes generating, as one information-data item, data including one Advanced-Encryption-Standard key and link-encryption-attribute data, and the transmitting includes transmitting the second encrypted data to the receiving apparatus by transmitting data obtained by superimposing the second encrypted data on the first encrypted data.

8. A non-transitory computer-readable medium storing computer readable instructions thereon, the computer readable instructions when executed by a transmitting apparatus cause the transmitting apparatus to perform a method comprising:

transmitting, to a receiving apparatus, first encrypted data obtained by encrypting stream data including a plurality of consecutive unit data items in accordance with a first encryption technique, the first encryption technique prescribing that, when the stream data is sequentially encrypted for each unit data item, a plurality of keys used to encrypt the unit data items are periodically updated according to predetermined rules;

outputting second encrypted data, the second encrypted data being obtained by generating M-bit data including at least one N-bit key from the plurality of keys used to generate the first encrypted data such that a total amount of N-bits of the at least one N-bit key is less than the generated M-bit data and any remaining bits of the M-bit data are padded;

encrypting the generated M-bit data in accordance with a second encryption technique; and transmitting the second encrypted data to the receiving apparatus by transmitting data obtained by superimposing the second encrypted data on the first encrypted data, wherein the outputting includes generating, as one information-data item, data including one Advanced-Encryption-Standard key and link-encryption-attribute data.

9. A receiving apparatus to receive first encrypted data from a transmitting apparatus, the receiving apparatus comprising:

a data receiver configured to receive first encrypted data, the first encrypted data being obtained by the transmitting apparatus by encrypting stream data including a plurality of consecutive unit data items in accordance with a first encryption technique, the first encryption technique prescribing that, when the stream data is sequentially encrypted for each unit data item, a plurality of keys used to encrypt the unit data items are periodically updated according to predetermined rules;

a data decryptor configured to decrypt the first encrypted data in accordance with a first decryption technique corresponding to the first encryption technique by using the plurality of keys used to generate the first encrypted data;

a key receiver configured to receive second encrypted data from the transmitting apparatus, the second encrypted data being obtained by the transmitting apparatus by generating M-bit data including i N-bit keys, where i represents at least one key from the plurality of keys used to generate the first encrypted data such that a total amount of N-bits of the at least one N-bit key is less than the generated M-bit data and any remaining bits of the M-bit data are padded, and encrypt the generated M-bit data in accordance with a second encryption technique; and a key decryptor configured to decrypt the second encrypted data in accordance with a second decryption technique corresponding to the second encryption technique, wherein the transmitting apparatus generates, as one information-data item, data including one Advanced-Encryption-Standard key and link-encryption-attribute data, transmits the second encrypted data to the receiving apparatus by transmitting data obtained by superimposing the second encrypted data on the first encrypted data.

10. The receiving apparatus according to claim 9, wherein the second encryption technique uses RSA encryption using 2048-bit data, the transmitting apparatus generates, as data to be encrypted in accordance with the RSA encryption, data having a total of 2048 bits by generating i N-bit information-data items, respectively, including at least the i keys, where N represents an integer value equal to 2048 or less, and i represents an integer value satisfying the expression i×N≦2048, arranging the i N-bit information-data items in predetermined order, and arranging, following the i N-bit information-data items, padding data having (2048-i×N) bits, and the key decryptor restores the i N-bit information-data items by executing decryption in accordance with the second decryption technique, and extracts the keys respectively included in the i N-bit information-data items.

11. The receiving apparatus according to claim 10, wherein the first encryption technique uses Advanced Encryption Standard, the transmitting apparatus generates Advanced-Encryption-Standard keys as the plurality of keys in accordance with the number of keys included in the second encrypted data, generates an Advanced-Encryption-Standard input including link-encryption-attribute data, outputs the first encrypted data generated such that the stream data is encrypted by using the generated Advanced-Encryption-Standard keys and the generated Advanced-Encryption-Standard input, and generates, as one information-data item, data including one Advanced-Encryption-Standard key and the link-encryption-attribute data included in one Advanced-Encryption-Standard input, the key decryptor restores the i N-bit information-data items by decryption in accordance with the second decryption technique, and extracts the Advanced-Encryption-Standard key and link-encryption-attribute data included in each of the i N-bit information-data items, and the receiving apparatus further includes
- an Advanced-Encryption-Standard-input generator configured to generate an Advanced-Encryption-Standard input corresponding to the Advanced-Encryption-Standard key extracted from a predetermined information-data item by the key decryptor using the link-encryption-attribute data extracted from the predetermined information-data item by the key decryptor; and
- a stream decryptor configured to decrypt a portion encrypted by the Advanced-Encryption-Standard key included in the first encrypted data by using the Advanced-Encryption-Standard key extracted from the predetermined information-data item by the key decryptor and the Advanced-Encryption-Standard input generated to the Advanced-Encryption-Standard key by the Advanced-Encryption-Standard input generator.

12. The receiving apparatus according to claim 11, wherein each information-data item is formed as a 304-bit link-encryption-key payload, and
the transmitting apparatus generates, as data to be encrypted in accordance with the RSA encryption, data having a total of 2048 bits by
generating and arranging six link-encryption-key payloads in predetermined order, where six is equal to i, and,
arranging, following the six link-encryption-key payloads, 224-bit padding data.

13. The receiving apparatus according to claim 11, wherein, when data obtained by superimposing the second encrypted data on the first encrypted data is transmitted to the receiving apparatus, after the key receiver receives and separates the data into the first encrypted data and the second encrypted data, the key receiver provides the first encrypted data to the stream decryptor and provides the second encrypted data to the key decryptor.

14. A receiving method to cause a receiving apparatus to receive first encrypted data comprising:
receiving, at the receiving apparatus, the first encrypted data transmitted from a transmitting apparatus, the first encrypted data being obtained by the transmitting apparatus by encrypting stream data including a plurality of consecutive unit data items in accordance with a first encryption technique, the first encryption technique prescribing that, when the stream data is sequentially encrypted for each unit data item, a plurality of keys used to encrypt the unit data items are periodically updated according to predetermined rules;
decrypting, at a data decryptor, the first encrypted data in accordance with a first decryption technique corresponding to the first encryption technique by using the plurality of keys used to generate the first encrypted data;
receiving, at the receiving apparatus, second encrypted data transmitted from the transmitting apparatus, the second encrypted data being obtained by the transmitting apparatus by generating M-bit data including at least one N-bit key from the plurality of keys used to generate the first encrypted data such that a total amount of N-bits of the at least one N-bit key is less than the generated M-bit data and any remaining bits of the M-bit data are padded;
encrypting the generated M-bit data in accordance with a second encryption technique; and
decrypting the received second encrypted data in accordance with a second decryption technique corresponding to the second encryption technique,
wherein the transmitting apparatus
generates, as one information-data item, data including one Advanced-Encryption-Standard key and link-encryption-attribute data,
transmits the second encrypted data to the receiving apparatus by transmitting data obtained by superimposing the second encrypted data on the first encrypted data.

15. A non-transitory computer-readable medium storing computer readable instructions thereon, the computer readable instructions when executed by a receiving apparatus cause the receiving apparatus to perform a method comprising:
receiving first encrypted data, transmitted from a transmitting apparatus, the first encrypted data being obtained by the transmitting apparatus by encrypting stream data including a plurality of consecutive unit data items in accordance with a first encryption technique, the first encryption technique prescribing that, when the stream data is sequentially encrypted for each unit data item, a plurality of keys used to encrypt the unit data items are periodically updated according to predetermined rules;
decrypting the first encrypted data in accordance with a first decryption technique corresponding to the first encryption technique using the plurality of keys used to generate the first encrypted data;
receiving second encrypted data transmitted from the transmitting apparatus, the second encrypted data being obtained by the transmitting apparatus by generating M-bit data including at least one N-bit key from the plurality of keys used to generate the first encrypted data such that a total amount of N-bits of the at least one N-bit key is less than the generated M-bit data and any remaining bits of the M-bit data are padded;
encrypting the generated M-bit data in accordance with a second encryption technique; and
decrypting the received second encrypted data in accordance with a second decryption technique corresponding to the second encryption technique,
wherein the transmitting apparatus
generates, as one information-data item, data including one Advanced-Encryption-Standard key and link-encryption-attribute data,
transmits the second encrypted data to the receiving apparatus by transmitting data obtained by superimposing the second encrypted data on the first encrypted data.

* * * * *